(12) United States Patent
Tsuchiya et al.

(10) Patent No.: US 11,820,154 B2
(45) Date of Patent: Nov. 21, 2023

(54) PRINTING APPARATUS AND PRINTING METHOD

(71) Applicant: CANON KABUSHIKI KAISHA, Tokyo (JP)

(72) Inventors: Okinori Tsuchiya, Kanagawa (JP); Kouta Murasawa, Kanagawa (JP); Hiromitsu Yamaguchi, Kanagawa (JP); Hideki Kubo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 17/667,599

(22) Filed: Feb. 9, 2022

(65) Prior Publication Data

US 2022/0250395 A1  Aug. 11, 2022

(30) Foreign Application Priority Data

Feb. 9, 2021  (JP) .................................. 2021-019238

(51) Int. Cl.
*B41J 2/21* (2006.01)
*C09D 11/322* (2014.01)

(52) U.S. Cl.
CPC ........... *B41J 2/2107* (2013.01); *B41J 2/2103* (2013.01); *C09D 11/322* (2013.01)

(58) Field of Classification Search
CPC ........................... G06K 15/105; G06K 15/107
See application file for complete search history.

(56) References Cited

U.S. PATENT DOCUMENTS

2022/0250401 A1  8/2022  Murasawa et al.

FOREIGN PATENT DOCUMENTS

WO  2018/139272 A1  8/2018

*Primary Examiner* — Julian D Huffman
(74) *Attorney, Agent, or Firm* — VENABLE LLP

(57) ABSTRACT

A printing apparatus comprises a determination unit configured to, in a case where fluorescent ink is used in printing of an image, determine an order of printing by the fluorescent ink and printing by the light emission suppressing ink that suppresses light emission of the fluorescent ink, in the plurality of scans. The determination unit determines the order of the printing by the fluorescent ink and the printing by the light emission suppressing ink such that the fluorescent ink is printed to be in a layer lower than the light emission suppressing ink in a region of a dark portion of the image.

12 Claims, 27 Drawing Sheets

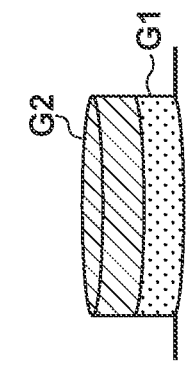 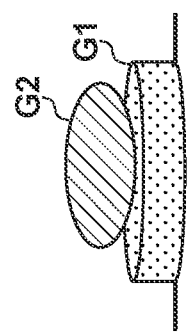 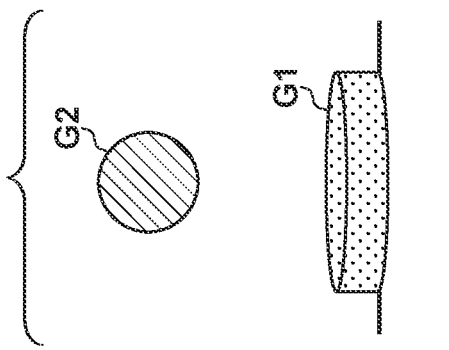 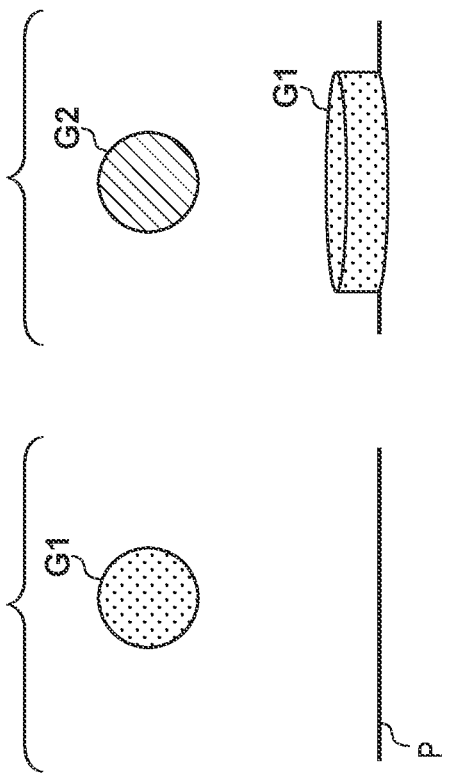
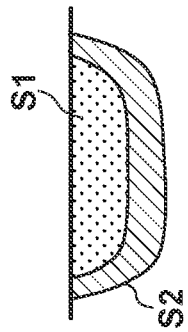 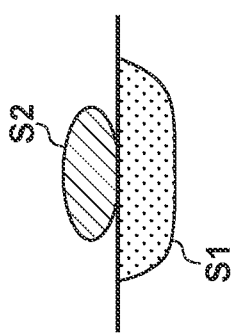 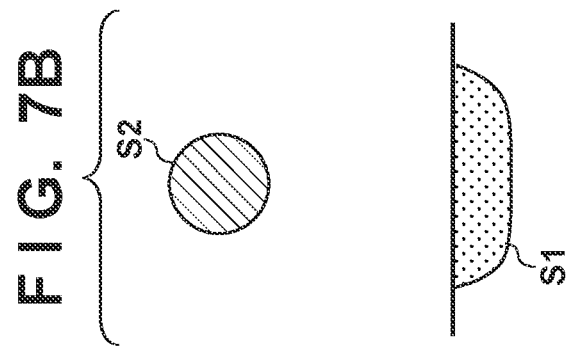 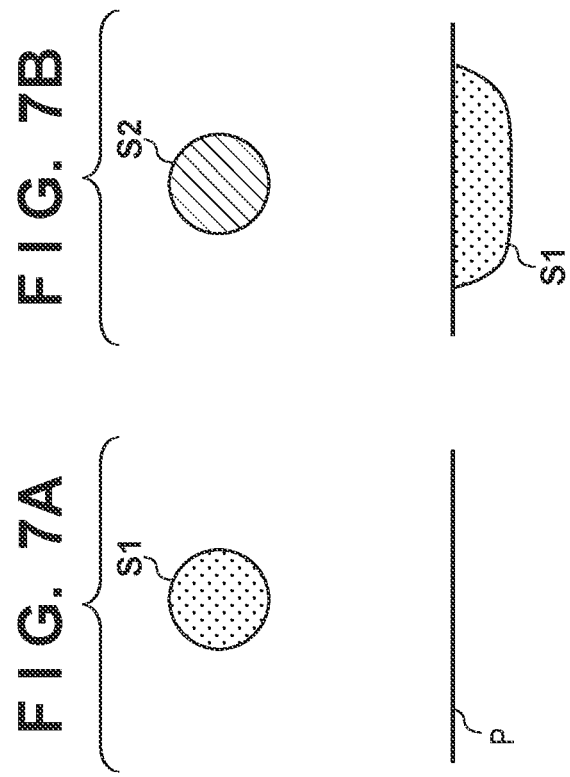

F I G. 9A
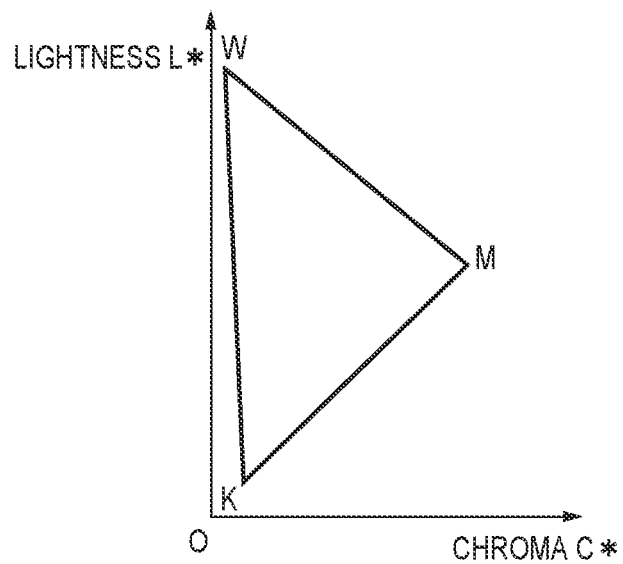
F I G. 9B
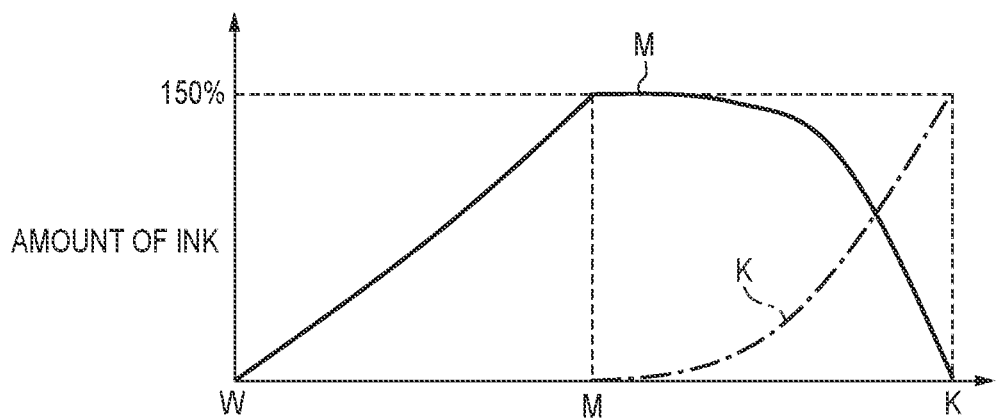
F I G. 9C
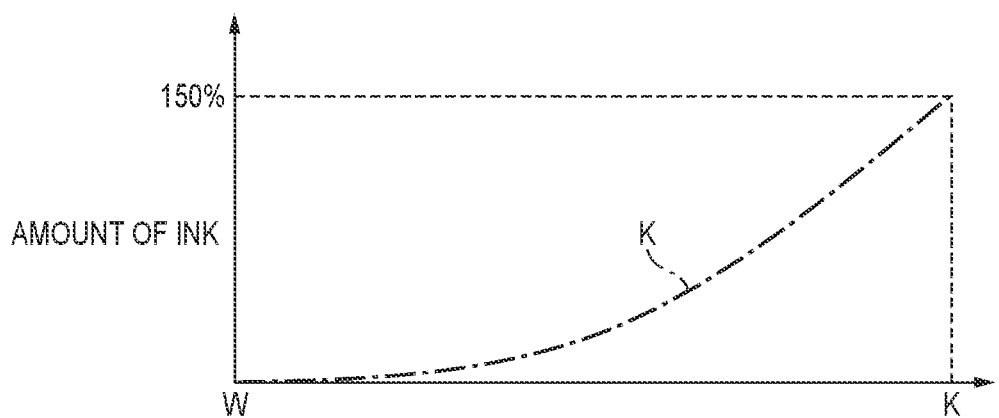

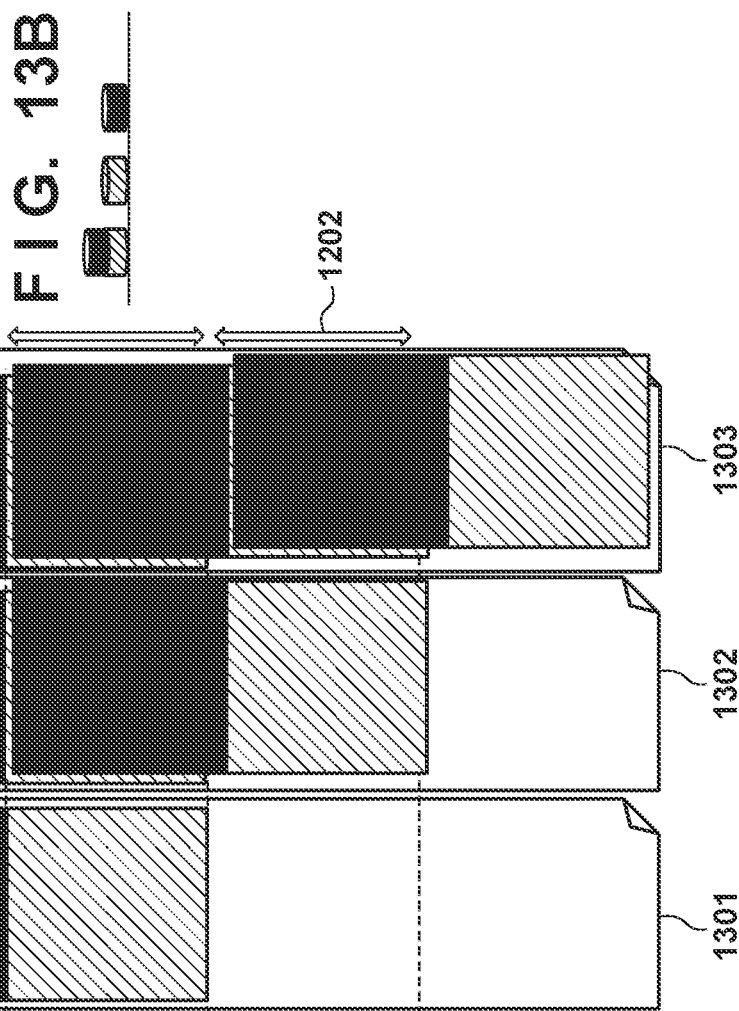
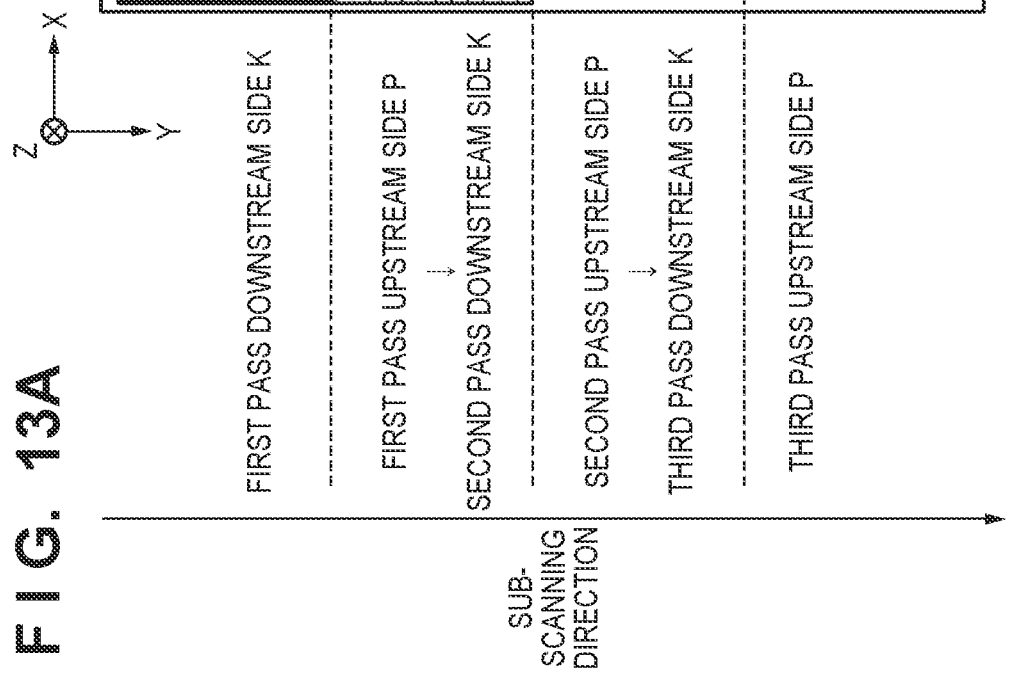

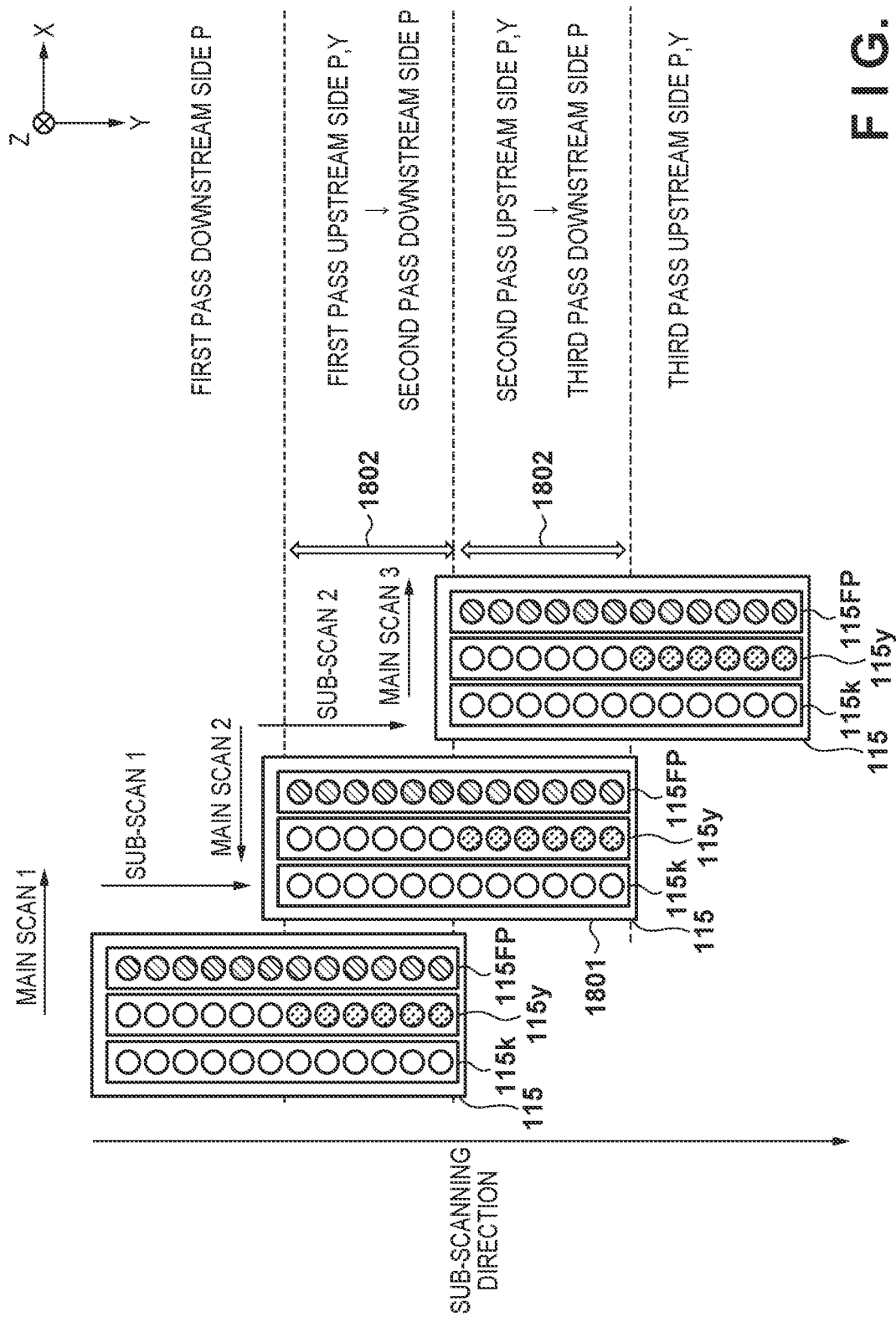

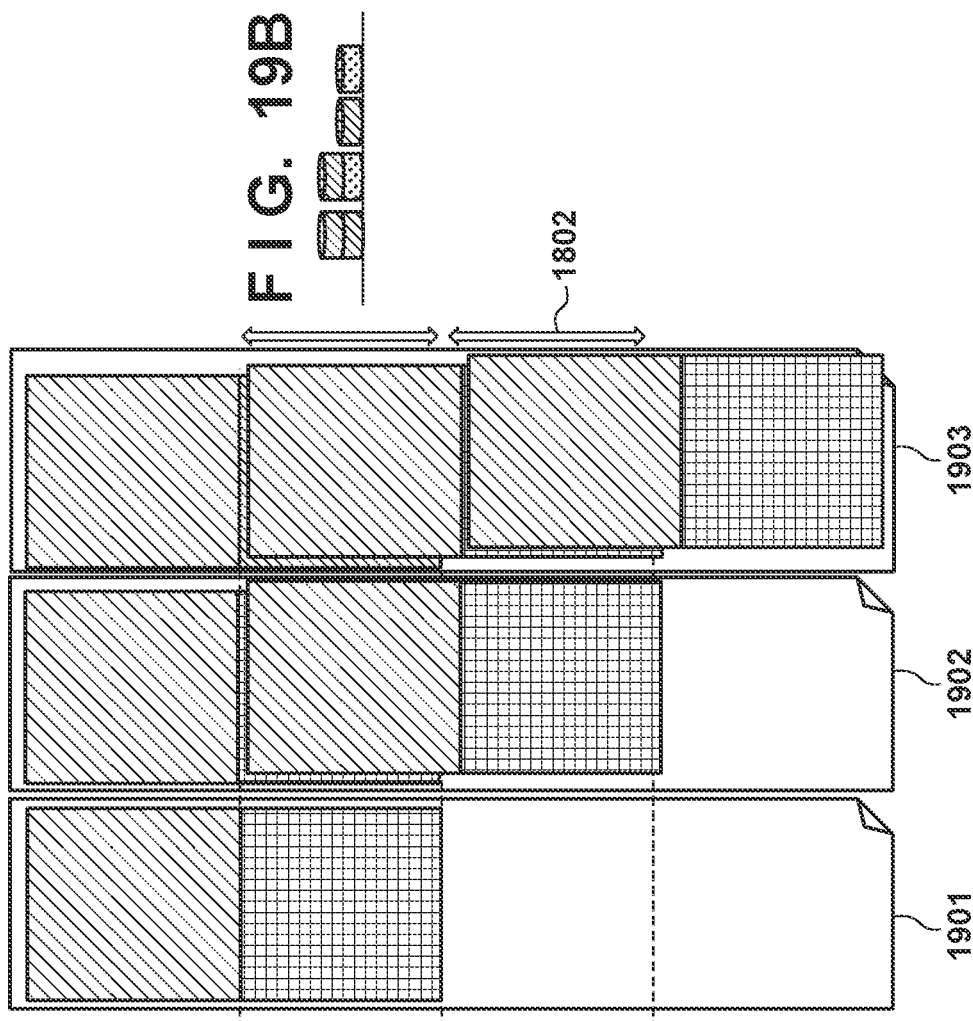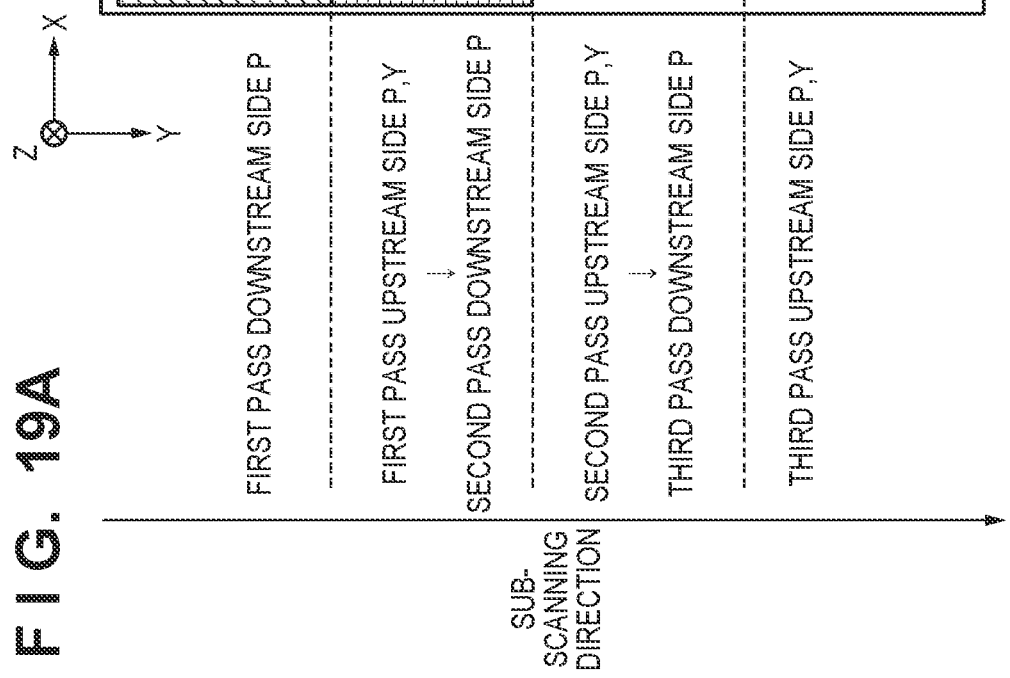

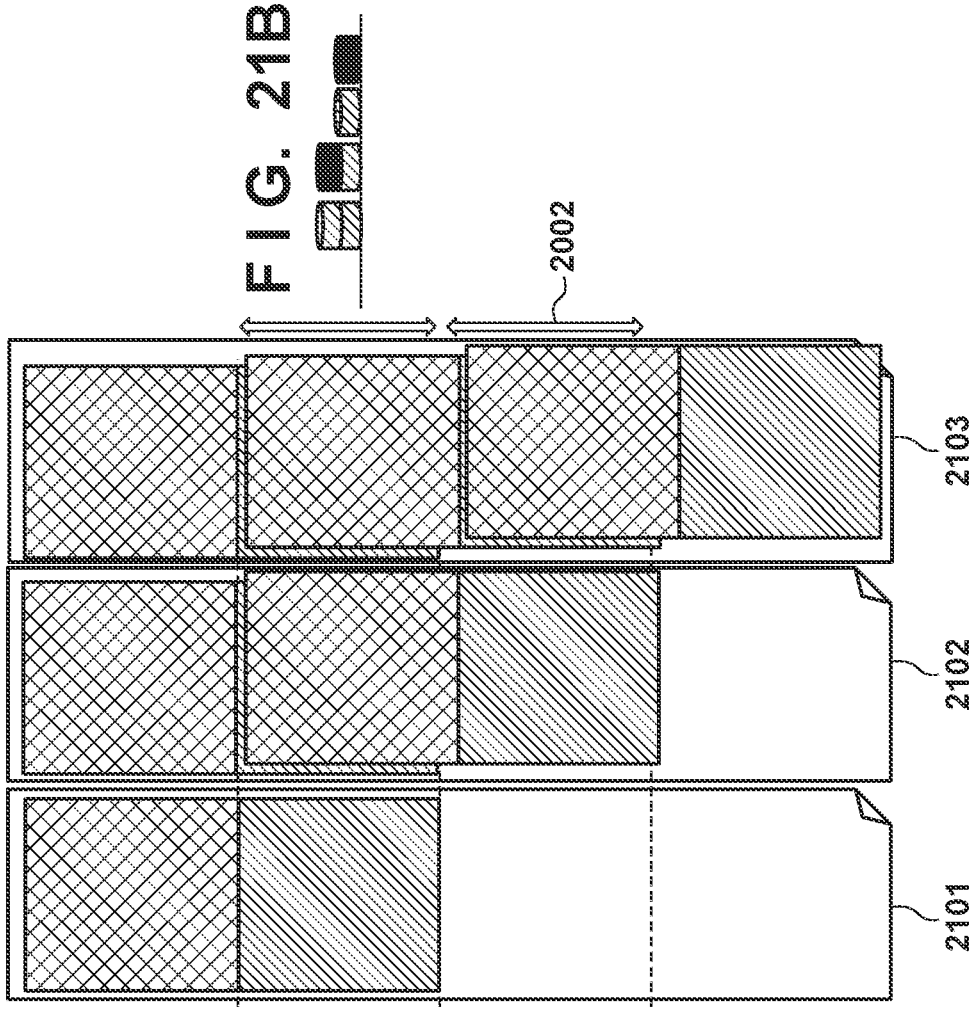

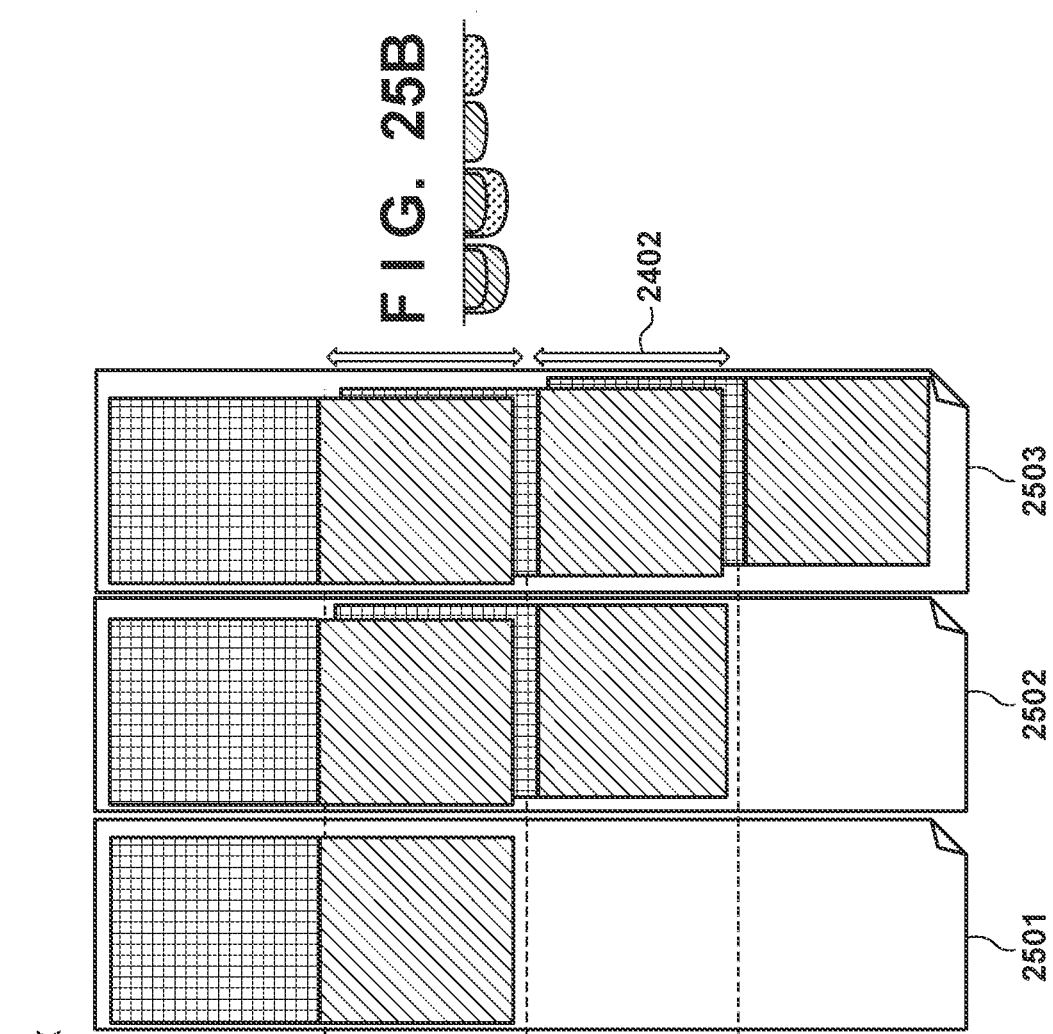
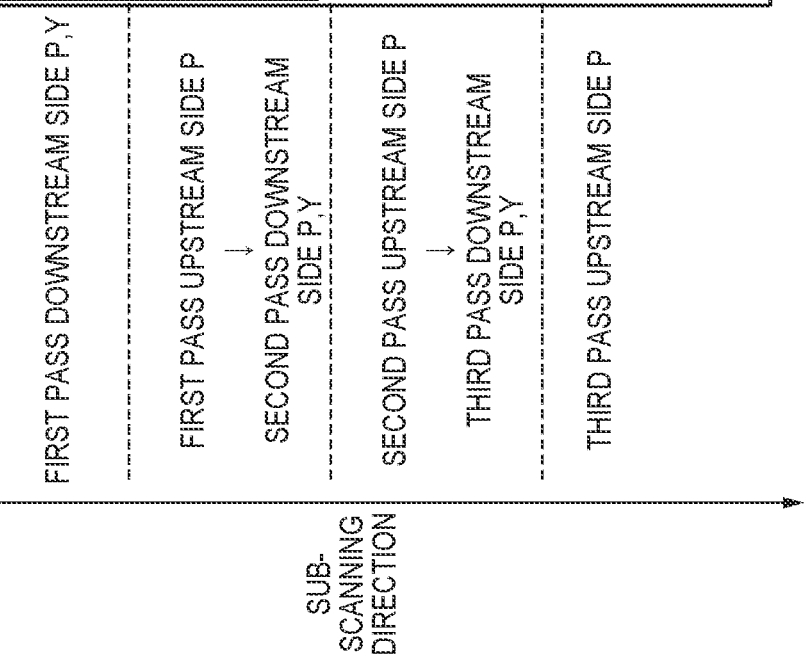

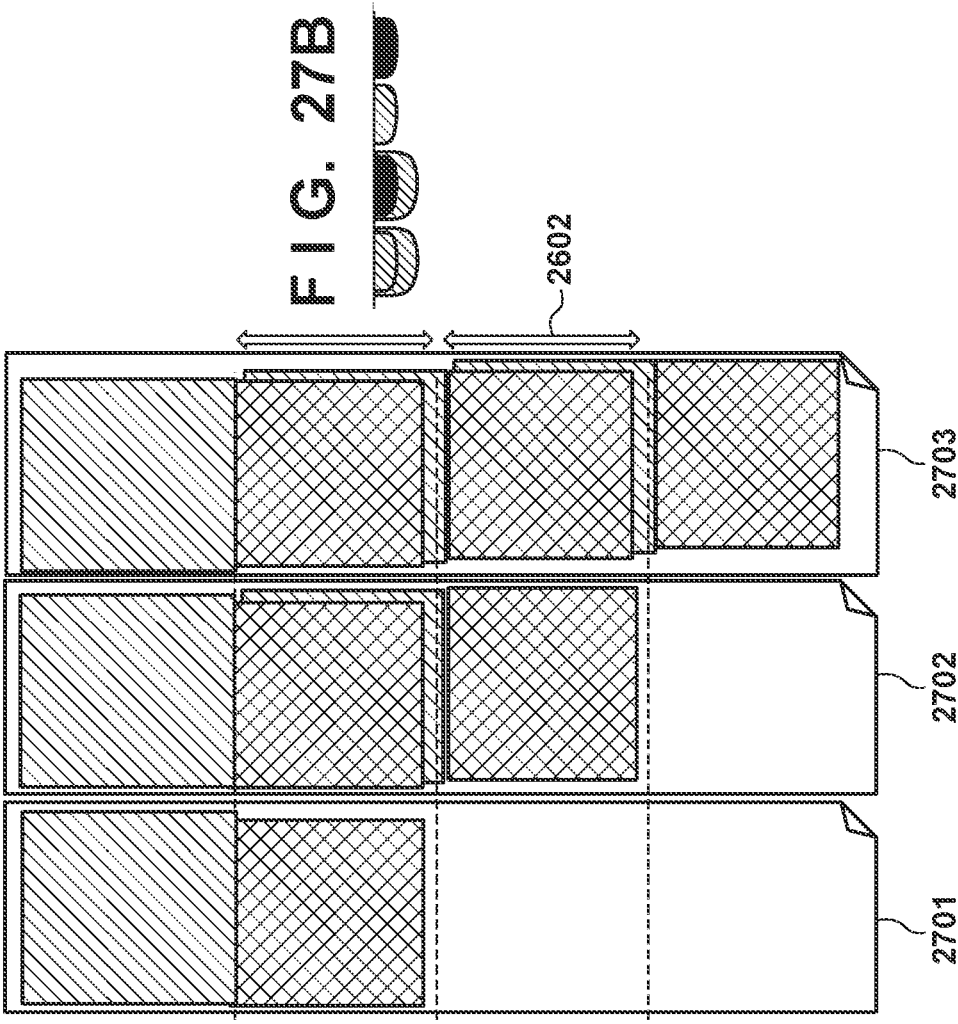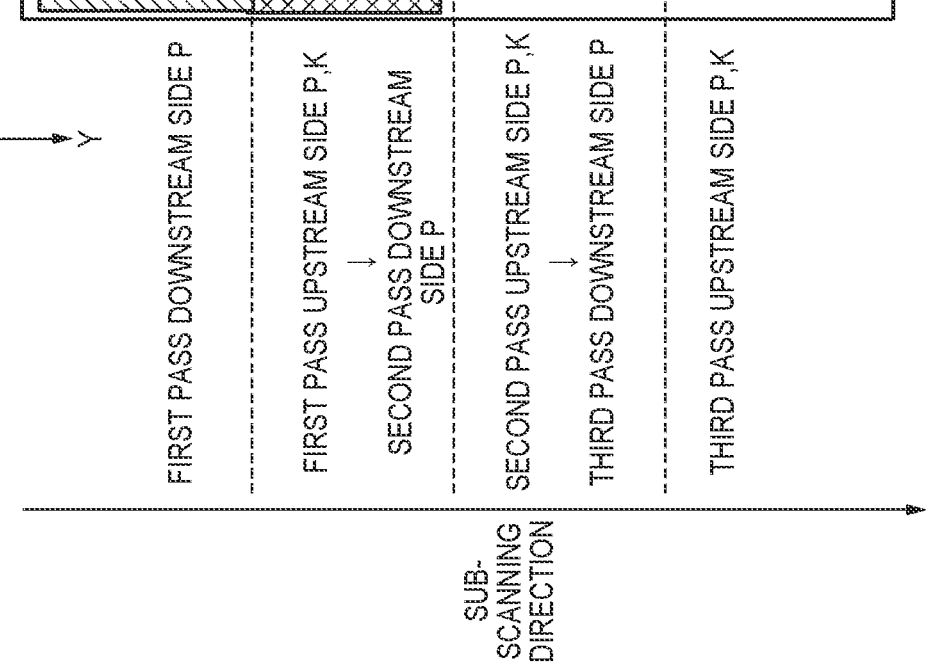

PRINTING APPARATUS AND PRINTING METHOD

BACKGROUND OF THE INVENTION

Field of the Invention

The present invention relates to a printing apparatus and a printing method for printing an image by applying ink droplets from a printing unit onto a printing medium.

Description of the Related Art

Printing apparatuses for printing images using fluorescent ink and non-fluorescent ink as ink for printing images on printing media are known. In such printing apparatuses, it is possible to print light and chromatic images by using fluorescent ink. Fluorescent, light, and chromatic images are attractive and are used for posters, POP-advertising (point of purchase advertising) for store front promotions at retail shops, and the like.

International Publication No. 2018/139272 describes a method for improving the ability to develop color of an image to be printed using fluorescent ink. It describes that it is possible, when printing using fluorescent ink and non-fluorescent ink, to improve the ability to develop color of an image to be printed using fluorescent ink by controlling the amount of ink per pass for each ink and the order in which droplets are ejected.

SUMMARY OF THE INVENTION

The present invention provides a printing apparatus and a printing method for preventing narrowing of a color gamut in a dark portion.

The present invention in one aspect provides a printing apparatus comprising: a printing unit provided with nozzle rows in a conveyance direction of a printing medium and configured to move back and forth in a scanning direction that intersects the conveyance direction of the printing medium and perform printing of an image by applying ink droplets on the printing medium from nozzles of the printing unit, the printing unit comprising a nozzle row corresponding to fluorescent ink and a nozzle row corresponding to light emission suppressing ink that suppresses light emission of the fluorescent ink; a control unit configured to control movement of the printing unit and conveyance of the printing medium such that an image is printed by a plurality of scans of the printing unit; and a determination unit configured to, in a case where the fluorescent ink is used in the printing of the image, determine an order of printing by the fluorescent ink and printing by the light emission suppressing ink in the plurality of scans, wherein the control unit performs the control of the movement of the printing unit and the conveyance of the printing medium based on the order determined by the determination unit, and the determination unit determines the order of the printing by the fluorescent ink and the printing by the light emission suppressing ink such that the fluorescent ink is printed to be in a layer lower than the light emission suppressing ink in a region of a dark portion of the image.

According to the present invention, it is possible to prevent narrowing of a color gamut in a dark portion.

Further features of the present invention will become apparent from the following description of exemplary embodiments with reference to the attached drawings.

BRIEF DESCRIPTION OF THE DRAWINGS

FIGS. 6A to 6D are diagrams for explaining an image formation process in an ink deposition model.

FIGS. 7A to 7D are diagrams for explaining an image formation process in an ink permeation model.

FIGS. 9A to 9C are diagrams illustrating color reproduction for when fluorescent pink ink is not used.

FIGS. 13A and 13B are diagrams for explaining printing states on a printing medium.

FIG. 18 is a diagram for explaining a printing process of a division printing control.

FIGS. 19A and 19B are diagrams for explaining printing states on a printing medium.

FIGS. 21A and 21B are diagrams for explaining printing states on a printing medium.

FIGS. 25A and 25B are diagrams for explaining printing states on a printing medium.

FIGS. 27A and 27B are diagrams for explaining printing states on a printing medium.

DESCRIPTION OF THE EMBODIMENTS

Figure 1:
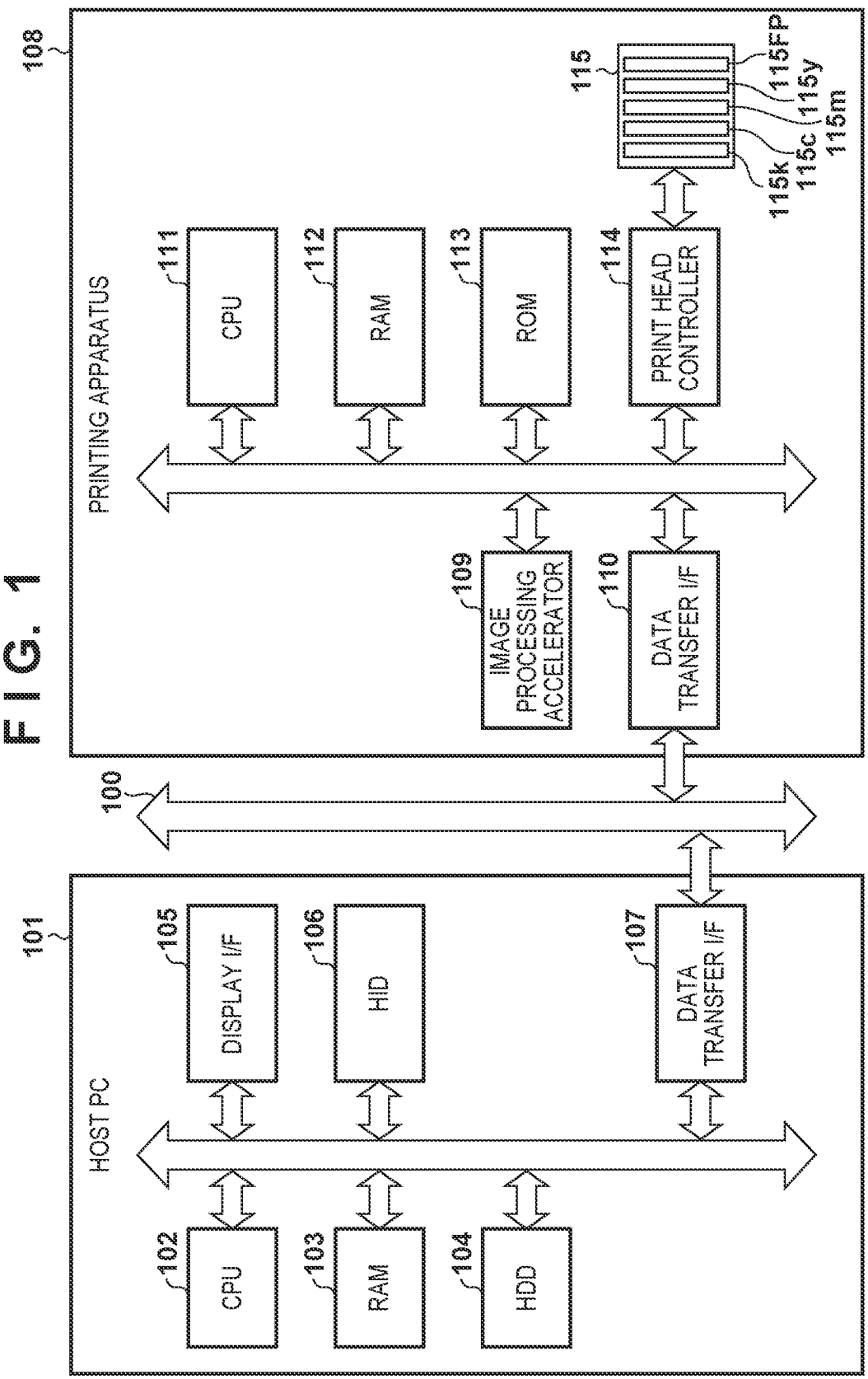
FIG. 1 is a block diagram illustrating a configuration of a printing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

However, in International Publication No. 2018/139272, although a light and chromatic image in which color is developed well is obtained in a light portion of a color reproduction gamut in which fluorescent ink is used, the color gamut may become narrower in a dark portion of the color reproduction gamut.

According to the embodiments, it is possible to prevent narrowing of the color gamut in the dark portion.

First Embodiment

The terms used in the present specification are defined in advance as follows. In this specification, the term "print" may be used not only in cases of forming meaningful information such as text and figures, and it doesn't matter whether what is formed is meaningful or meaningless or has been manifested to be visually perceivable by a human. "Print" also broadly includes cases where an image, pattern, or the like is formed on a printing medium or the processing of a medium is performed.

"Printing medium" broadly includes not only paper used in general printing apparatuses but also things that can receive ink, such as cloth, plastic film, metal plates, glass, ceramics, wood, and leather.

"Ink" should be broadly construed in the same manner as the definition of "print" above. "Ink" is meant to represent a liquid which, by being applied onto a printing medium, can be used for forming an image, a design, a pattern, or the like, to process a printing medium, or being supplied for ink processing. Here, ink processing refers to coagulation or insolubilization of a colorant in an ink applied to a printing medium, for example.

"Nozzle", unless specified otherwise, encompasses everything from a discharge port to a fluid channel that communicates therewith as well as an element that produces energy that is used to discharge ink.

In order to perform printing on a printing medium, a printhead scans over the printing medium to perform printing. Here, head movement during acceleration or deceleration of the head for printing or related to printing is referred to as "scanning".

A "color reproduction gamut" is also referred to as color reproduction range, color gamut, and gamut. In general, it refers to a range of reproducible colors in any color space. Also, there is color gamut volume as an index which represents the size of the color reproduction gamut. A color gamut volume is a three-dimensional volume in any color space. The chromaticity points constituting the color reproduction gamut may be discrete. For example, a particular color reproduction gamut is represented by 729 points on CIE-L*a*b*, the points between which may be determined using a known interpolation operation such as tetrahedral interpolation or cubic interpolation. In such a case, it is possible to use, as the corresponding color gamut volume, volumes in CIE-L*a*b* such as a tetrahedron and a cube constituting the color reproduction gamut obtained corresponding to the interpolation calculation method and accumulated.

The color reproduction gamut and the color gamut in the present specification are not limited to a particular color space, but in the present specification, the color reproduction gamut in a CIE-L*a*b* space is described as an example. Similarly, the numerical values of the color reproduction gamut in the present specification illustrate a volume when cumulatively calculated in the CIE-L*a*b* space on the assumption of tetrahedral interpolation.

<Overall Printing System>

FIG. 1 is a block diagram illustrating a configuration of a printing system in the present embodiment. As a PC 101, a host PC or a tablet PC is used. A CPU 102 executes various processes by reading programs stored in an HDD 104 into a RAM 103 serving as a work area and then executing the programs. For example, the CPU 102 generates print data that can be printed by a printing apparatus 108 and transfers the data to the printing apparatus 108 in accordance with a command received from a user via an HID (Human Interface Device) I/F 106 or a touch panel (not illustrated) or a program stored in the HDD 104. The CPU 102 performs a predetermined process on the print data received from the printing apparatus 108 via a data transfer I/F 107 in accordance with a program stored in the HDD 104 and displays the result and various information on a display (not illustrated) via a display I/F 105.

In the printing apparatus 108, a CPU 111 comprehensively controls the printing apparatus 108 by reading and executing programs stored in a ROM 113 into a RAM 112 serving as a work area. An image processing accelerator 109 is hardware capable of performing image processing faster than the CPU 111. The image processing accelerator 109 is activated by the CPU 111 writing parameters and data required for image processing to a predetermined address in the RAM 112. After reading the above parameters and data, the image processing accelerator 109 performs image processing on the data. However, the image processing accelerator 109 is not an essential element, and the same processing may be performed in the CPU 111. The above parameters may be stored in the ROM 113 or a storage (not illustrated) such as a flash memory or an HDD.

Here, the image processing performed by the CPU 111 or the image processing accelerator 109 will be described. The image processing is, for example, a process of generating data indicating dot formation positions of ink at each scan by a printhead 115 based on the received print data. The CPU 111 or the image processing accelerator 109 performs a color conversion process and a quantization process of the received print data.

The color conversion process is a process of separating colors into ink densities handled by the printing apparatus 108. For example, the received print data includes image data indicating an image and fluorescence data for performing fluorescence printing. When the image data is data that represents an image in color space coordinates such as sRGB, which are representation colors of a monitor, data that represents an image in sRGB color coordinates (R, G, and B) is converted into subtractive color mixture ink data (CMYK) handled by the printing apparatus 108 or ink data (CMYKF) that includes a fluorescent ink color. Fluorescence data is converted to fluorescent ink data. In addition, if there are both data that indicates an image in the sRGB color coordinates (R, G, and B) and fluorescence data, they are converted into subtractive color mixture ink data (CMYK) and fluorescent ink data. Alternatively, they are converted to ink data (CMYKF) containing a fluorescent ink color and fluorescent ink data. In such a case, the fluorescent ink data is generated in two planes. The color conversion method is realized by matrix arithmetic processing, processing using three-dimensional LUT (look-up table), four-dimensional LUT, and the like.

As an example, the printing apparatus 108 of the present embodiment uses black (K), cyan (C), magenta (M), yellow (Y), and fluorescence (F) ink. Therefore, the RGB signal image data and fluorescence data are converted into image data consisting of K, C, M, Y, and F color signals, which are 8 bits, respectively. The color signal of each color corresponds to the application amount of each ink. Further, although 5 colors, K, C, M, Y, and F, are given as an example of the number of ink colors, other ink colors such as light cyan (Lc), light magenta (Lm), or gray (Gy) ink having a low density may be used for improving image quality. In such a case, ink signals corresponding to these are generated. In the present embodiment, ink such as light cyan (Lc), light magenta (Lm), gray (Gy) will be described as subtractive color mixture ink. In addition, achromatic ink such as black (K) or gray (Gy) will also be described as subtractive color mixture ink.

After the color conversion process, a quantization process is performed on the ink data. The quantization process is a process of decreasing the number of levels in the gradation of ink data. In the present embodiment, quantization is performed using a dither matrix in which threshold values to be compared with values of ink data are arranged for each pixel. By the quantization process, binary data indicating whether or not to form a dot at each dot formation position is generated in the end.

After the image processing is performed, binary data is transferred to the printhead 115 by a printhead controller 114. At the same time, the CPU 111 operates a carriage motor for operating the printhead 115 via the printhead controller 114 and also performs printing control so as to operate a conveyance motor for conveying a printing medium (sheet). The printhead 115 scans over the printing medium, and at the same time, ink droplets are applied onto the printing medium by the printhead 115 to form an image.

When performing printing by a plurality of scans, after the predetermined image processing is performed, a scanning order determination process is performed. The scanning order determination process is a process in which an image is thinned out by using a mask pattern or the like on quantized data in order to generate data corresponding to each scan. In this case, the image processing accelerator 109 may be used to speed up the processing.

The PC 101 and the printing apparatus 108 are connected via a communication line 100. In the present embodiment, a local area network is described as an example of the communication line 100, but the communication line 100 may be a USB hub, a wireless communication network using a wireless access point, a connection using a Wi-Fi direct communication function, or the like.

Hereinafter, the printhead 115 will be described as having a total of 5 printing nozzle rows for inks of four colors, cyan (C), magenta (M), yellow (Y), and black (K), and fluorescent ink of fluorescent pink (FP). The fluorescent ink may be fluorescent red (FR), fluorescent yellow (FY), fluorescent green (FG), or fluorescent blue (FB) aside from fluorescent pink.

<Printing Apparatus Printhead>

Figure 2:
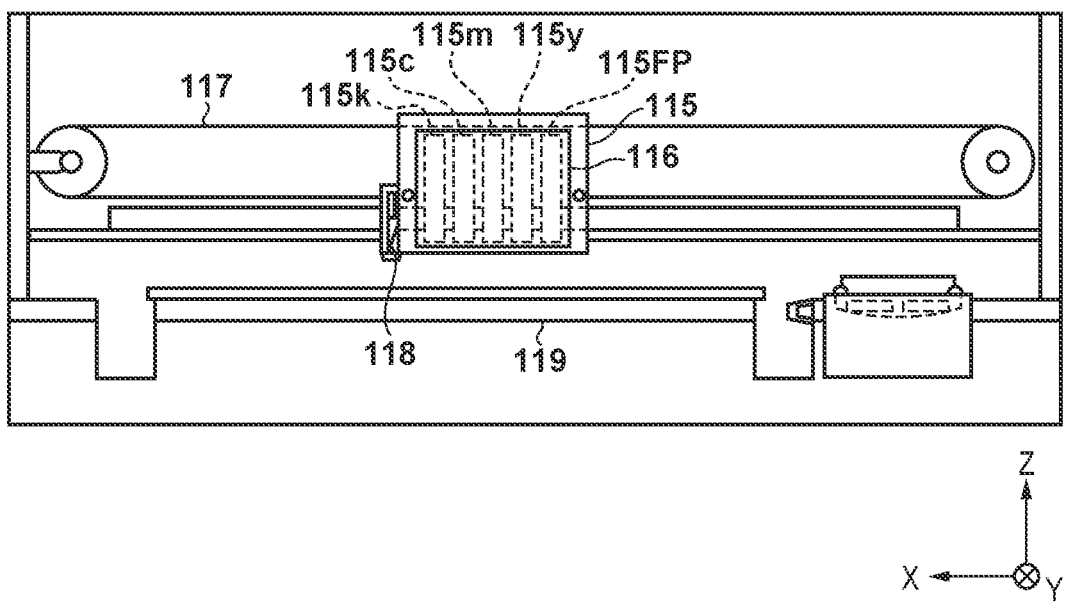
FIG. 2 is a diagram for explaining a printhead.

FIG. 2 is a diagram for explaining the printhead 115 according to the present embodiment. In the present embodiment, an image is printed by multiple scans of N times for a unit region of one nozzle row. The printhead 115 includes a carriage 116; nozzle rows 115*k*, 115*c*, 115*m*, 115*y*, and 115FP; and an optical sensor 118. The carriage 116 on which the five nozzle rows 115*k*, 115*c*, 115*m*, 115*y*, and 115FP and the optical sensor 118 are mounted can move back and forth along an X direction (main scanning direction) in the drawing using a driving force of the carriage motor transmitted via a belt 117. The carriage 116 moves in the X direction relative to a printing medium, and ink droplets are ejected from each nozzle of the nozzle rows in the direction of gravity (z direction in the drawing) based on the print data. Thus, an image of 1/N times of a main scan is printed on the printing medium placed on a platen 119. When one main scan is completed, the printing medium is conveyed along a conveyance direction, which intersects the main scanning direction, by a distance corresponding to the width of 1/N times of a main scan (y direction in the drawing). By these operations, an image of the width of one nozzle row is printed by multiple scans of N times. By alternately repeating such a main scan and a conveying operation, an image is gradually formed on the printing medium.

The printing resolution in the X direction is determined by the discharge frequency and the moving speed of the carriage. The printing resolution in the Y direction is determined by the nozzle resolution of the printhead 115. In the present embodiment, for example, both printing resolutions are set to 600 [dpi]. Therefore, the ejected ink dots are printed at a resolution of 600 [dpi] in the vertical and horizontal directions. The optical sensor 118, by performing a detection operation while moving with the carriage 116, determines whether the printing medium is present on the platen 119.

<Description of Printhead>

Figure 3:
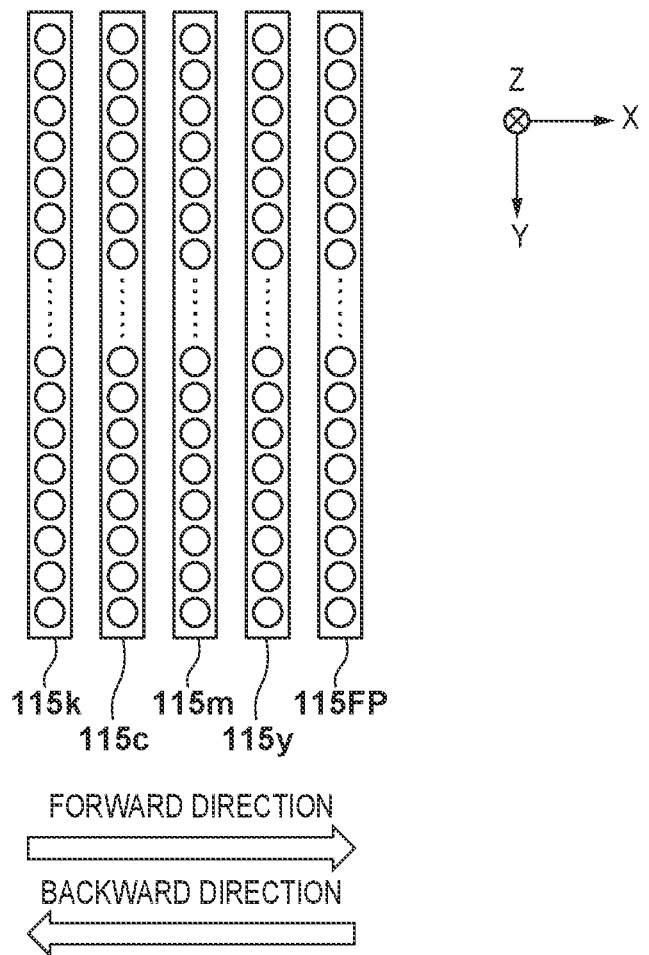
FIG. 3 is a diagram illustrating an arrangement of nozzle rows.

FIG. 3 is a diagram illustrating an arrangement of the nozzle rows when the printhead 115 is viewed from the top (−z direction) of the printing apparatus 108. In the printhead 115, five nozzle rows are arranged such that their positions in the X direction are different. That is, a nozzle row 115C corresponding to C ink, a nozzle row 115M corresponding to M ink, a nozzle row 115Y corresponding to Y ink, a nozzle row 115K corresponding to K ink, and a nozzle row 115FP corresponding to FP ink are arranged. C ink droplets are ejected from the nozzles in the nozzle row 115C. M ink droplets are ejected from the nozzles in the nozzle row 115M. Y ink droplets are ejected from the nozzles in the nozzle row 115Y. K ink droplets are ejected from the nozzles in the nozzle row 115K. FP ink droplets are ejected from the nozzles in the nozzle row 115FP. In each nozzle row, a plurality of nozzles for ejecting ink droplets are arranged at a predetermined pitch along the Y direction.

<Characteristics of Fluorescent Ink and Subtractive Color Mixture Ink>

Figure 4:
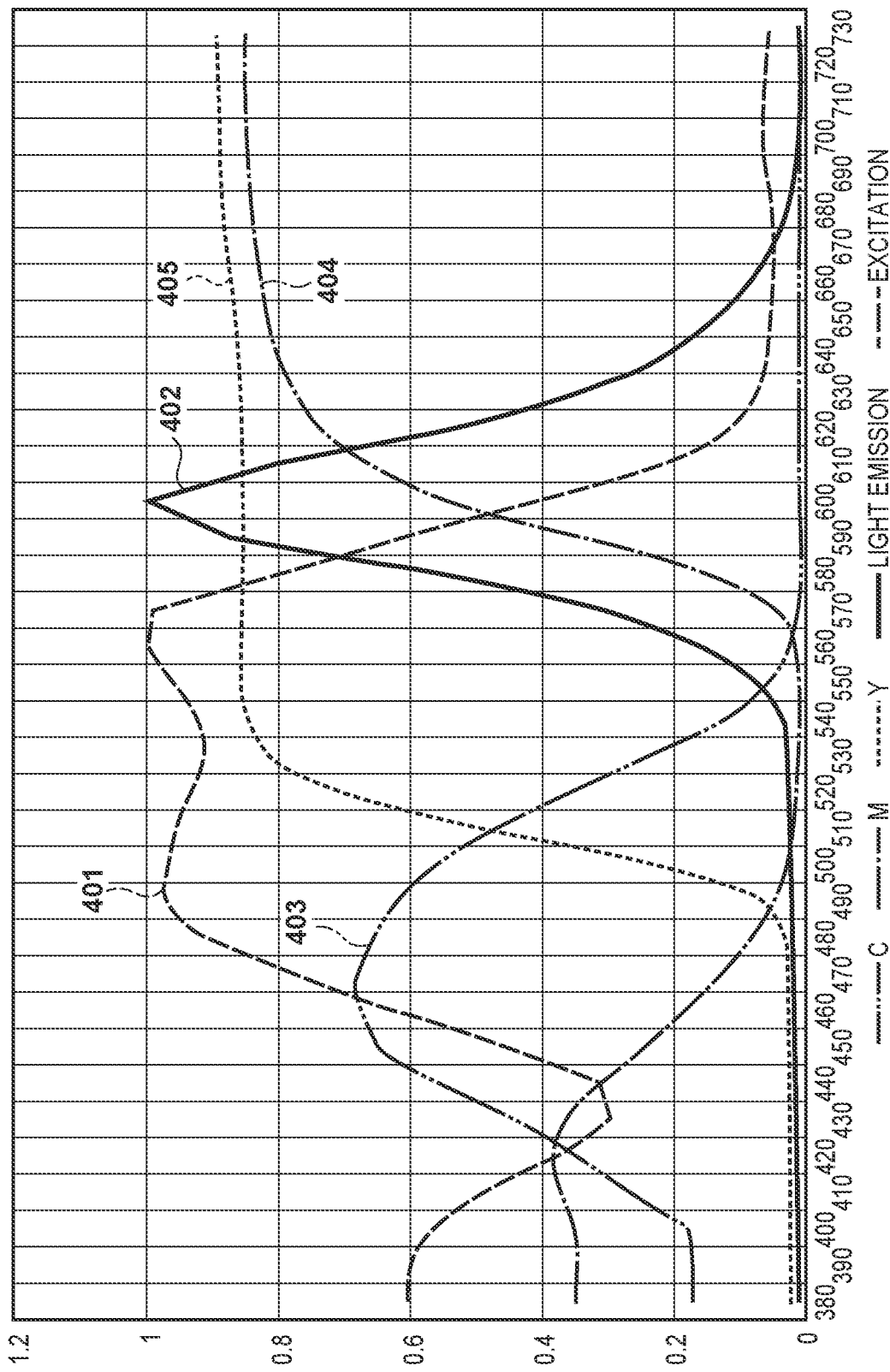
FIG. 4 is a diagram illustrating the intensity of excitation and the intensity of emission when fluorescent pink ink is printed.

Fluorescent coloring material is a coloring material which enters an excited state from a ground state by absorbing light of an excitation wavelength and develops color by returning to the ground state by emitting light of an emission wavelength. FIG. 4 is a graph of the intensity of an excitation wavelength 401 and the intensity of an emission wavelength 402 when the fluorescent pink ink is printed on the printing medium. The horizontal axis of FIG. 4 illustrates the wavelength of light, and the vertical axis illustrates the intensity. The graph of FIG. 4 illustrates respective intensities of light when the wavelength of light irradiated onto a printing sample and the wavelength of light received from the sample are respectively changed and then detected.

The emission wavelength 402 represents, for each wavelength, the intensity of light received from the printing sample when light of an excitation wavelength is irradiated onto the printing sample. FIG. 4 illustrates a case where 480-nm light is irradiated onto the printing sample. The excitation wavelength 401 represents the intensity of the light received when the wavelength of the light to be received is fixed and the wavelength of the light to be irradiated to the printing sample is changed. FIG. 4 illustrates a case where the wavelength of the light to be received is fixed at 600 nm. As illustrated in FIG. 4, the wavelength range where the fluorescent ink printed on the printing medium is excited overlaps with the wavelength range where it emits light and is on a shorter wavelength side. The excitation wavelength 401 varies in intensity by wavelength, so there are wavelengths that efficiently emit light and wavelengths that do not. Further, since the fluorescent coloring material emits light, the reflectance at the emission wavelength often exceeds 1. In the present embodiment, a coloring material having characteristics as described above is referred to as a fluorescent coloring material.

In the above, excitation and light emission of the fluorescent pink ink have been described, but in the present embodiment, fluorescent ink that emits light of other wavelengths may be used. For example, fluorescent blue ink that emits light in a blue region (450 nm to 500 nm) may be used, or fluorescent green ink that emits light in a green region (500 nm to 565 nm) may be used. For example, fluorescent yellow ink that emits light in a yellow region (565 nm to 590 nm) may be used, or fluorescent orange or red ink that emits light in a red region (590 nm to 780 nm) may be used. Further, fluorescent ink in which the above is combined may be used. For example, fluorescent yellow ink or the like which emits light in a region in which a yellow region and a red region are combined may be used. In addition, fluorescent ink having different intensities of excitation wavelength may be combined to adjust the color tone. For example, fluorescent pink that emits light in the orange region in which excitation in the blue region is weak and excitation in the green region is strong may be used.

In the present embodiment, non-fluorescent ink is referred to as subtractive color mixture ink. In other words, ink that absorbs light of a specific wavelength in the irradiated light and does not emit light is referred to as subtractive color mixture ink. For example, the subtractive color mixture ink has a spectral reflectance as illustrated for cyan ink 403, magenta ink 404, and yellow ink 405 in FIG. 4. Incidentally, the graph of FIG. 4 illustrates the results measured using a method of measuring the spectral reflectance. Unlike fluorescent ink, subtractive color mixture ink does not have a reflectance greater than 1 because they only absorb light.

Next, mixing of fluorescent ink and subtractive color mixture ink on the printing medium will be described with reference to FIG. 4. When fluorescent pink ink and the yellow ink 405 are mixed, the yellow ink absorbs light in a wavelength range of the excitation wavelength 401 of the fluorescent pink ink. Therefore, since the light for exciting the fluorescent pink ink is absorbed by the yellow ink, it cannot be sufficiently excited, and light emission is reduced.

When fluorescent pink ink and the cyan ink 403 are mixed, the cyan ink absorbs light in a wavelength range of the emission wavelength 402 of the fluorescent pink ink. Therefore, light emitted by the fluorescent pink ink is absorbed by the cyan ink, and light emission is reduced.

When fluorescent pink ink and the magenta ink 404 are mixed, the magenta ink absorbs light in a wavelength range in which fluorescent pink ink is more sensitive to excitation. Therefore, the fluorescent pink ink cannot be sufficiently excited, and light emission is reduced. Also, light emitted by the fluorescent pink ink is absorbed by the magenta ink, and light emission is reduced.

When fluorescent pink ink and black ink (not illustrated) are mixed, the black ink absorbs light in the wavelength range of the excitation wavelength 401 of the fluorescent pink ink and also absorbs light in the wavelength range of the emission wavelength 402. Therefore, the fluorescent pink ink cannot be sufficiently excited, and light emission is reduced.

In other words, when the fluorescent pink ink and the subtractive color mixture ink are mixed, the contribution ratio of the fluorescent pink ink to color development decreases. This characteristic is also greatly affected by the positional relationship between fluorescent ink and subtractive color mixture ink on a printing medium. The effect of subtractive color mixture ink is felt more strongly when an ink layer of fluorescent ink is on a layer lower than that of subtractive color mixture ink than when an ink layer of fluorescent ink is on a layer higher than that of subtractive color mixture ink. As a result, the contribution ratio of fluorescent ink to color development is also smaller when the fluorescent ink is on a layer lower than that of the subtractive color mixture ink than when it is on a layer higher than that of the subtractive color mixture ink.

Figure 5:
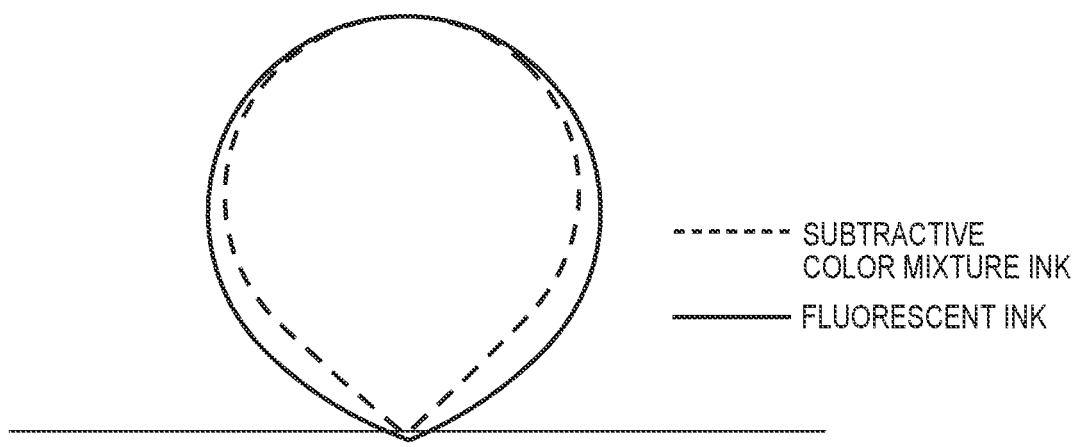
FIG. 5 is a diagram illustrating gonio-spectral reflection characteristics of fluorescent ink and subtractive color mixture ink.

The gonio-spectral reflection characteristics of fluorescent ink and subtractive color mixture ink will be described with reference to FIG. 5. FIG. 5 illustrates fluorescent ink with a solid line and subtractive color mixture ink with a broken line and schematically illustrates a bidirectional reflectance distribution function for the gonio-spectral reflection characteristics of each ink. As a method for measuring the gonio-spectral reflection characteristics, for example, a method of irradiating vertical light on a sample printed on a printing medium and detecting the received reflected light by changing the angle is used. As illustrated in FIG. 5, it can be seen that light is more isotropically scattered with regard to the gonio-spectral reflection characteristics of fluorescent ink than the gonio-spectral reflection characteristics of subtractive color mixture ink. This is because fluorescent ink absorbs light, becomes excited, and then emits light, thereby eliminating the directionality of incident light, and so directionality of light strongly depends on the directionality of light emission of fluorescent ink. As described above, fluorescent ink has a stronger tendency for scattering light than the subtractive color mixture ink.

<Fluorescent Ink>

Next, fluorescent ink used in the present embodiment will be described. In the present embodiment, fluorescent ink prepared by mixing a dispersant of a coloring material having fluorescent characteristics, a solvent, and an activator is used. The dispersant of the fluorescent coloring material used in the present embodiment is a dispersant of the coloring material having the above fluorescent characteristics. Examples include NKW-3207E (fluorescent pink aqueous dispersant: Nihon Keiko Kagaku) or NKW-3205E (fluorescent yellow aqueous dispersant: Nihon Keiko Kagaku), but any dispersant of a coloring material having fluorescent characteristics may be used.

Ink is made by combining a known solvent and activator with the above fluorescent coloring material dispersant and dispersing the fluorescent coloring material dispersant. The method for dispersing the fluorescent coloring material dispersant is not particularly limited. For example, a fluorescent coloring material dispersant dispersed by a surfactant, a resin dispersion fluorescent coloring material dispersant dispersed by a dispersion resin, or the like can be used. Of course, it is also possible to use a fluorescent coloring material dispersant having a different dispersion method in combination. As the surfactant, an anionic, non-ionic, cationic, or zwitterionic activator can be used. Any dispersion resin may be used as long as it is a resin having water solubility or water dispersibility, but among them, a dispersion resin having a weight average molecular weight of 1,000 or more and 100,000 or less is preferred, and 3000 or more and 50,000 or less is particularly preferred. As the solvent, for example, an aqueous medium containing water and a water-soluble organic solvent is preferably used.

In the present embodiment, for example, pigment inks of five colors, black (K), cyan (C), magenta (M), yellow (Y), and fluorescent pink (FP), are used.

<Printing Medium>

The printing medium in the present embodiment has a base material and at least 1 ink receiving layer. In the present embodiment, for example, a printing medium for printing by an ink jet printing method is used. In the present embodiment, for example, glossy paper is used as a printing medium, and pigment ink is used as a coloring material.

<Image Formation Process on Printing Medium: Ink Deposition Model>

An image formation process on a printing medium will be described with reference to FIGS. 6A to 6D. FIGS. 6A to 6D are diagrams for explaining an image formation process in an ink deposition model in which ink that landed on a printing medium is deposited on the printing medium. This corresponds to an image formation process where printing is performed on a glossy paper whose gaps existing in the surface of a printing medium are smaller than a particle size of coloring material particles contributing to color development in pigment ink, for example. The ink deposition model is a model of an image formation process in which a particle size of coloring material particles contributing to color development in ink is larger than gaps in a surface of a printing medium, and an image is formed by depositing coloring material particles on the surface of the printing medium to form an ink layer.

Image formation is performed as illustrated in FIGS. 6A to 6D.

As illustrated in FIG. 6A, pigment ink G1 is supplied onto the printing medium P. Then, as illustrated in FIG. 6B, the pigment ink G1 lands on the printing medium P and deposits. Furthermore, the subsequent pigment ink G2 is supplied. Then, as illustrated in FIG. 6C, the pigment ink G2 lands on the pigment ink G1 which has already been deposited. Then, as illustrated in FIG. 6D, the pigment ink G2 is deposited on the pigment ink G1 which has already been deposited, creating a layer. Thus, in the ink deposition model, image formation in which subsequent dot remains in an upper layer on the printing medium is performed. For example, when glossy paper is used as a printing medium and pigment ink is used as a coloring material, image formation by an ink deposition model is performed. In the present embodiment, a printing medium of an ink deposition model is used.

<Color Reproduction of Fluorescent Pink Ink>

Figure 8:
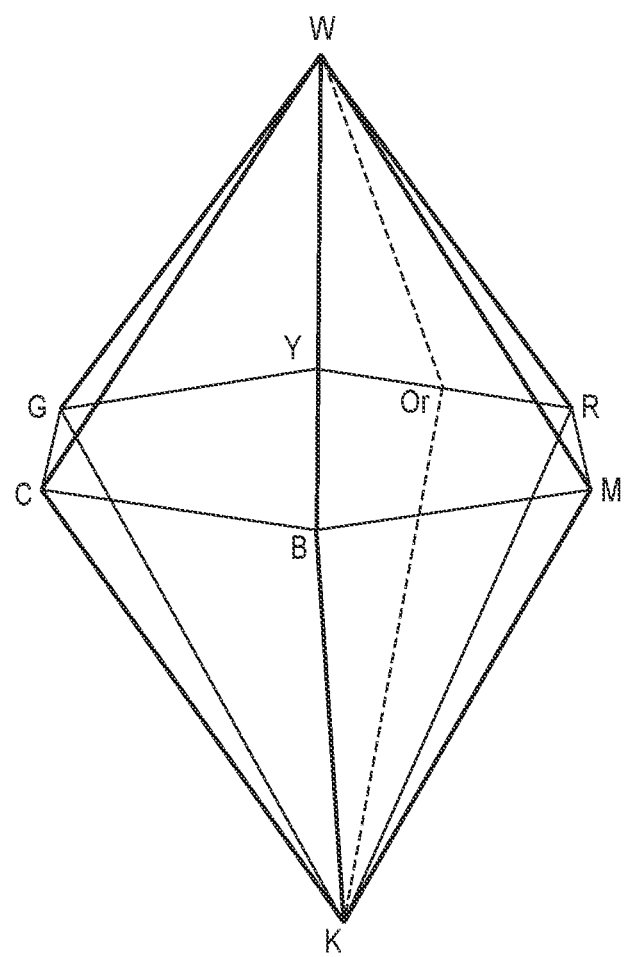
FIG. 8 is a diagram illustrating a color reproduction gamut in a schematic three-dimensional shape.

The color reproduction of fluorescent pink ink (FP) is described. FIG. 8 is a diagram illustrating a color reproduction gamut in a schematic three-dimensional shape. In this three-dimensional color shape, with a gray line from a white point W to a black point K as the center, each of the points, R, Y, G, C, B, and M, is a maximum chroma point in their respective hues, R, Y, G, C, B, and M. Hereinafter, the maximum chroma points in this three-dimensional color shape are referred to as primaries.

A W-M-K plane involving fluorescent pink ink will be described. First, a case where fluorescent pink ink is not used will be described as a comparison target. FIG. 9A is a diagram for describing, on chroma $C^*$-lightness $L^*$ in CIE $L^*a^*b^*$, the color reproduction of the W-M-K plane when fluorescent pink ink is not used. Here, $C^*=\sqrt{(a^{*2}+b^{*2})}$. As illustrated in FIG. 9A, it can be seen that the color reproduction gamut W-M-K has a triangular shape enclosed in nearly straight lines. FIG. 9B is a diagram illustrating how ink is used (color-separated) on a W-M-K line to realize this color reproduction. As illustrated in FIG. 9B, M ink increases as it approaches primary M from the white point W and K ink increases from the primary M to the black point K.

Figure 10A:
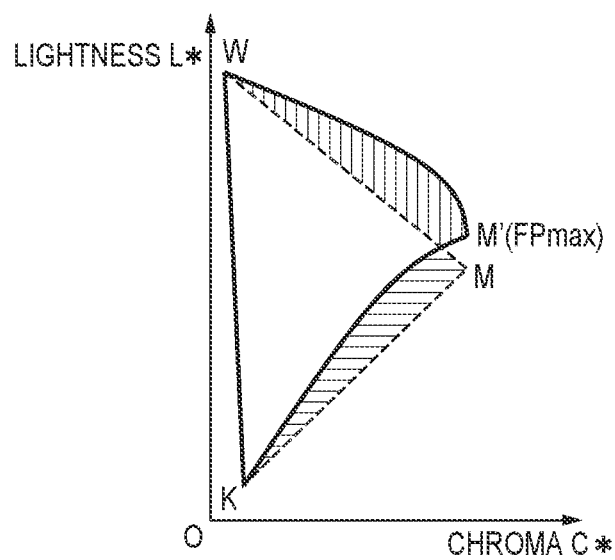
FIGS. 10A and 10B are diagrams illustrating a color reproduction gamut for when fluorescent pink ink is used.
Figure 10B:
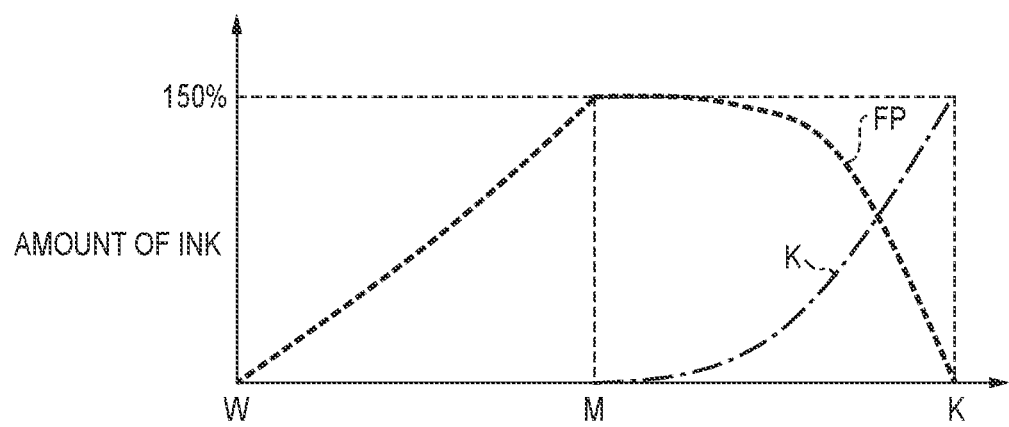

Meanwhile, the bold line in FIG. 10A illustrates a conventional color reproduction gamut when using fluorescent pink ink. For the region indicated by vertical line hatching, chroma appears lighter due to an effect of the fluorescent pink ink expanding the color gamut. However, for the color region of the dark portion indicated by horizontal line hatching, the region is carved down compared to when fluorescent pink ink is not used, and the color gamut is narrowed. FIG. 10B is a diagram illustrating how ink is used (color is separated) on a W-M-K line to realize this color reproduction. As illustrated in FIG. 10B, fluorescent pink ink increases as it approaches primary M from the white point W and K ink increases from the primary M to the black point K.

<Printing Order and Color Reproduction of Fluorescent Pink Ink>

Figure 11A:
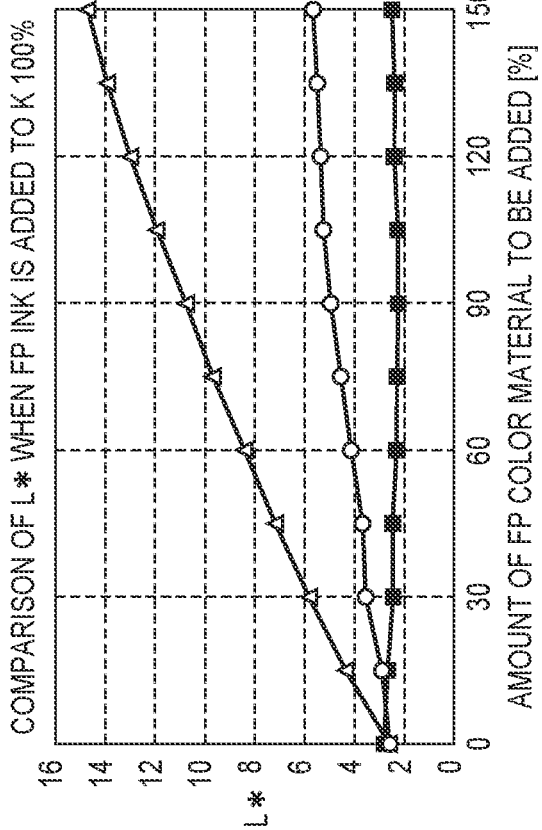
FIGS. 11A and 11B are diagrams illustrating characteristics for when printing order is varied for fluorescent pink ink.

FIG. 11A is a diagram illustrating a change in lightness when the amount of coloring material of fluorescent pink ink is changed and then added to the K ink having a constant amount of 150%. FIG. 11A illustrates a change in lightness when the printing order is changed. As illustrated in FIG. 11A, it can be seen that when the printing method is such that the fluorescent pink ink is in an upper layer on the printing medium, the lightness $L^*$ becomes lighter as the amount of coloring material of fluorescent pink ink to be added increases.

Figure 11B:
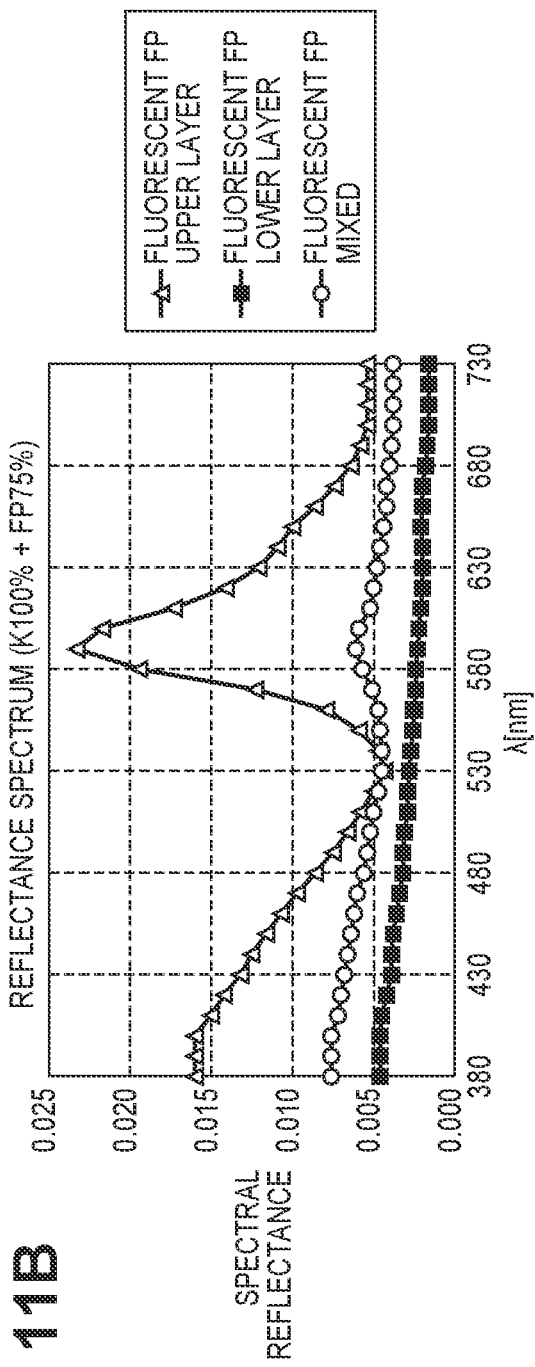

FIG. 11B is a diagram illustrating a reflectance spectrum at that time. FIG. 11B illustrates the reflectance spectrum for when 75% of fluorescent pink ink is added to 150% of K ink. When the printing method is such that fluorescent pink ink is in an upper layer on the printing medium, the reflection becomes stronger around 590 [nm] at which the peak of the emission spectrum of the fluorescent pink ink is present, and it can be seen that the emission influence of fluorescent pink ink remains even in such a dark portion. From the above, it can be seen that the cause for the color region of the dark portion being carved down when the fluorescent pink ink is used is that the fluorescent pink ink is printed so as to be in an upper layer, by which a light emission effect manifests in the fluorescent pink ink. In the present embodiment, with respect to the carving down of the color region of the dark portion when the fluorescent pink ink is used, it is possible to reduce the emission influence of fluorescent pink ink by controlling the order in which ink is printed.

As illustrated in FIG. 11A, when fluorescent pink ink is printed so as to be in a lower layer on the printing medium, the lightness $L^*$ can be kept substantially constant regardless of the amount of the coloring material of fluorescent pink ink. Even in the reflectance spectrum of FIG. 11B, when the fluorescent pink ink is printed to be in a lower layer on the printing medium, there is no peak even in the vicinity of 590 [nm] and reflection can be suppressed over the entire spectrum.

This is because light emission from fluorescent pink ink on the printing medium is absorbed by black ink positioned in a layer higher than that of fluorescent pink ink and having an absorption effect around an emission wavelength of 590

[nm] of the fluorescent pink ink and an effect of suppressing light emission. Note that, any other ink may be used as the light emission suppressing ink, as long as it has an absorption effect at 590 [nm], which is an emission wavelength of fluorescent pink ink. For example, as illustrated in the spectrum for each ink in FIG. 4, even the cyan ink 403 can suppress light emission. Further, similarly to K ink, gray (Gy) ink can suppress reflection over the entire spectrum and can suppress light emission.

As illustrated in FIG. 11A, when fluorescent pink ink and K ink are mixed and printed in the same ink layer, it is possible to suppress an increase in the lightness L* when the amount of the coloring material of the fluorescent pink ink is increased. Even in the reflectance spectrum of FIG. 11B, when fluorescent pink ink and K ink are mixed and printed in the same ink layer, it is possible to keep the peak of 590 [nm] to a very small amount and mostly suppress reflection over the entire spectrum.

This is considered to be due to the fact that the K ink, which has an absorption effect around 590 [nm] and has an effect of suppressing light emission, is adjacent to the fluorescent pink ink and absorbs a part of the isotropic light emission from the fluorescent pink ink on the printing medium. It is also possible to suppress an increase in lightness L* for when fluorescent pink ink is added by such printing in which inks are mixed in the same ink layer.

From the above, in the present embodiment, in order to prevent narrowing in the color region of the dark portion, printing is performed by controlling the fluorescent pink ink to be mixed or be in a lower layer on the printing medium.

Figure 28:
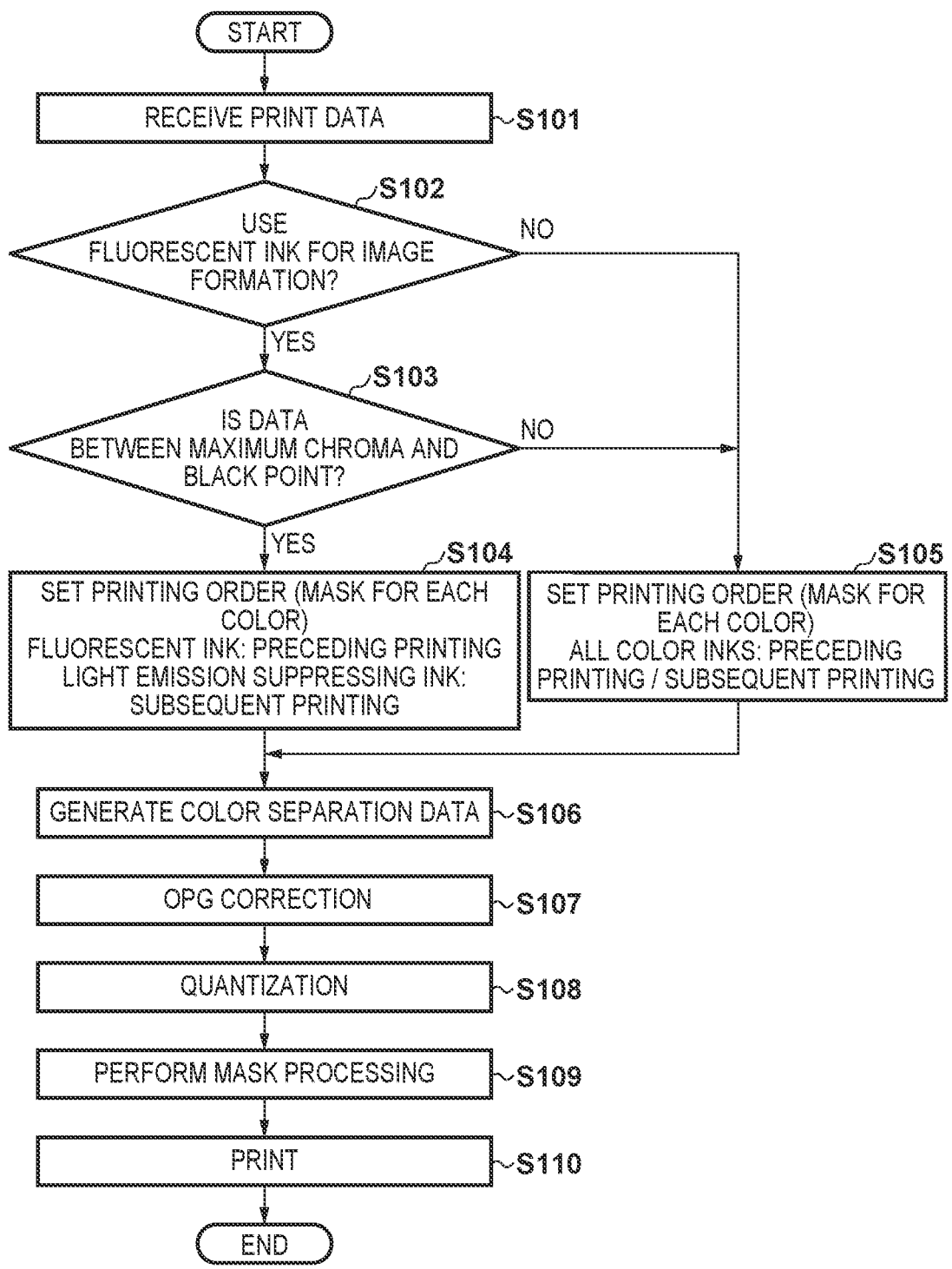
FIG. 28 is a flowchart illustrating a printing control process.

FIG. 28 is a flowchart illustrating a printing control process in the present embodiment. The process of FIG. 28 is realized, for example, by the CPU 111 of the printing apparatus 108 reading a program stored in the ROM 113 into the RAM 112 and executing the program. In the present embodiment, in order to prevent narrowing in the color region of the dark portion, printing is performed by controlling the fluorescent pink ink to be mixed or to in a lower layer on the printing medium.

In step S101, the CPU 111 receives print data transmitted from the PC 101. The print data includes RGB data and fluorescence data. In step S102, the CPU 111 determines whether or not to use fluorescent ink for image formation. This determination may be made based on whether the user has specified a fluorescent or non-fluorescent mode as the print mode of the printing apparatus 108. When the user manually sets and uses one of them, for example, the determination is performed in conjunction with the manual setting of the user. Alternatively, if the fluorescence data is received as data in addition to the RGB data, it may be determined to use the fluorescent ink. If it is determined to use fluorescent ink, the process proceeds to step S103, and if it is determined to not use fluorescent ink, the process proceeds to step S105.

In step S103, the CPU 111 determines, for each pixel, a position in an input RGB color space from the received print data. That is, the CPU 111 determines whether or not a pixel of the print data are positioned between a maximum chroma point and the black point on the surface of the RGB color space. For example, for (R, G, B), a determination may be made based on whether at least one of them is 0. If it is determined that a pixel is positioned between a maximum chroma point and the black point on the surface of the RGB color space, the process proceeds to step S104. Meanwhile, if it is determined that a pixel is not positioned between a maximum chroma point and the black point on the surface of the RGB color space, the process proceeds to step S105.

In step S104, the CPU 111 sets a mask for controlling the printing order for each ink color. In multi-pass printing in which the printhead 115 is thinned and divided and then printing is performed multiple times in the same image region, mask processing is performed using a thinning pattern (hereinafter, referred to as mask pattern). This mask pattern has a pattern that defines ON/OFF for each pixel for each scan (pass), and printed dots can be thinned out by only being printed when ON in each pass. The mask pattern may be stored in the ROM 113 or the like of the printing apparatus 108 or may be acquired from the HDD 104 of the PC 101 or the like. The mask processing is a process for determining in which pass and with which nozzle of the printhead 115 printing is performed for the quantized image data. In the present embodiment, the mask processing is used for control to change the printing order of ink and switches the mask setting for each color. In step S104, the CPU 111 sets a preceding printing mask for upstream printing of fluorescent ink. Also, the CPU 111 sets a subsequent printing mask for downstream printing of light emission suppressing ink. In addition, the CPU 111 sets preceding and subsequent printing masks for printing the upstream side and downstream side together as a whole for other inks.

In step S105, the CPU 111 sets the masks in the same way as step S104 and, for inks of all colors, sets preceding and subsequent printing masks for printing the upstream and downstream side together as a whole. Steps S103 to S105 are repeated for each pixel.

In step S106, the CPU 111 generates color separation data from the print data received in step S101. The color separation data may, for example, be generated by an interpolation operation such as tetrahedral interpolation by the image processing accelerator 109 by reading 3DLUT (lookup table) stored in the ROM 113 out to the RAM 112. In step S107, the CPU 111 performs OutputGamma correction according to the dot coverage on the printing medium. In step S108, the CPU 111 performs the quantization process. As a result of the quantization process, binary data corresponding to ON/OFF of dots in the output resolution is generated. In step S109, the CPU 111 compares the quantized data with the mask for each color set in step S104 or S105 to determine the nozzles used for printing in each scan. In step S110, the CPU 111 scans the carriage and controls the printhead 115 to print dots from a defined nozzle.

<Control of Ink Printing Order>

In the present embodiment, in order to prevent narrowing in the color region of the dark portion, printing is performed by controlling the printing order such that fluorescent pink ink is in a layer in which it is mixed into the same ink layer as another ink or is in a lower layer on the printing medium. In order to print the fluorescent pink ink so as to be mixed into the same ink layer as another ink or be in a lower layer on the printing medium, a division printing control in which a nozzle row of the printhead 115 is divided into two groups of upper and lower sides and prints by scanning back and forth is performed.

Figure 12:
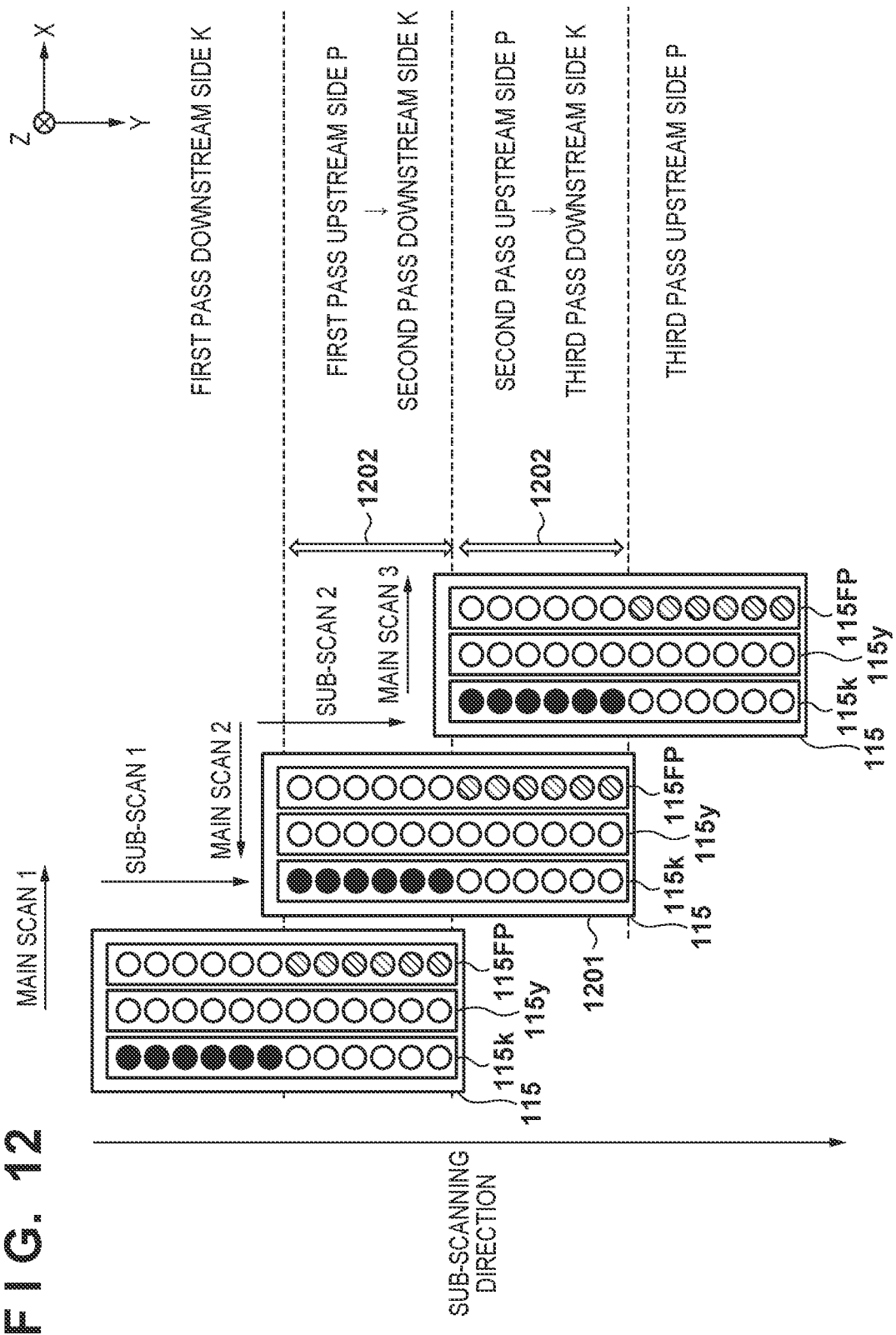
FIG. 12 is a diagram for explaining a printing process of a division printing control.

FIG. 12 is a diagram for explaining the printhead 115 and the printing process of a division printing control on a printing medium using the K ink nozzles 115K and the fluorescent pink ink nozzles 115FP. Here, for descriptive purposes, two types of ink, fluorescent pink ink which emits light and K ink which suppresses light emission will be given, and a case where ink is ejected from all the target nozzles will be described. Originally, printing is performed by conveying a printing medium with respect to the printhead 115, but in the following, for descriptive purposes, the figure will be described in such a way where the printing medium is at a fixed position and the printhead 115 moves.

FIG. 12 is a diagram for explaining division printing control in the case where fluorescent pink ink is printed first to form it in a lower layer on the printing medium, and K ink is printed later to form it on an upper layer on the printing medium. The nozzles of the printhead 115 are used by dividing it vertically along the sub-scanning direction. For the fluorescent pink ink nozzles 115FP, nozzles which are ½ the width of the full row of nozzles on an upstream side in the conveyance direction (corresponding to the sub-scanning direction) indicated by diagonal lines is used. For the K ink nozzles 115K, nozzles which are ½ the width of the full row of nozzles on a downstream side in the conveyance direction indicated by blackening are used.

The printing operation will be described in detail. In a forward main scan (1), on the upstream side of the printhead 115, printing is performed with a width of ½ the full row of nozzles using fluorescent pink ink. At that time, on the downstream side, printing is performed with a width of ½ the full row of nozzles using K ink. Subsequently, sub-scan (1), which is conveyance of ½ the width of the full row of nozzles, is performed. The position of the printhead on the printing medium after executing a sub-scan (1) is a position 1201. In the upstream portion of a backward main scan (2), the fluorescent pink ink is printed first on a blank sheet portion of the printing medium. In the downstream portion of the backward main scan (2), K ink is printed subsequently over the printing medium on which the fluorescent pink ink has been previously printed in the main scan (1). By repeating this series of operations, printing is performed on the entire printing medium. Incidentally, in FIG. 12, a region 1202 indicates a region where the printing neither starts nor ends but is in a constant state of the above repetition. After the printing medium is conveyed by the sub-scan (2), in the downstream portion of a forward main scan (3), K ink is printed subsequently over the printing medium on which the fluorescent pink ink has been previously printed. Hereinafter, the process is repeated in the same manner.

FIG. 13A is a diagram for explaining printing states on a printing medium attained by the division printing operation of FIG. 12. Originally, printing is performed by conveying a printing medium with respect to the printhead 115, but in the following, for descriptive purposes, the figure will be described in such a way where the printing medium is at a fixed position and the printhead 115 moves. In addition, regarding the printing order of ink and an ink layer to be formed, for descriptive purposes, description will be given assuming that ink is ejected by all the target nozzles.

The printing state of a first pass is as illustrated in a printing state 1301. The solid black portion indicates a printing region for K ink, and the diagonally hatched portion indicates a printing region for fluorescent pink ink. As illustrated in the printing state 1301, printing with K ink (solid black portion) is performed by the forward main scan (1) on white paper at the downstream side in the first pass. In addition, the diagonally hatched portion indicates that printing with fluorescent pink ink is performed on white paper on the upstream side in the first pass.

A printing state 1302 is a state in which printing of a second pass is performed over the printing of the first pass. As illustrated in the printing state 1302, on the downstream side in the second pass, printing with K ink (solid black portion) is performed by the backward main scan (2) over the region printed in advance in the first pass with fluorescent pink ink (diagonally hatched portion). Further, on the upstream side in the second pass, printing with fluorescent pink ink (diagonally hatched portion) is performed on white paper.

The printing state of a third pass is as illustrated in a printing state 1303. As illustrated in the printing state 1303, on the downstream side in the third pass, printing with K ink (solid black portion) is performed by the forward main scan (3) over the region printed in advance in the second pass with fluorescent pink ink (diagonally hatched portion). Further, on the upstream side in the third pass, printing with fluorescent pink ink (diagonally hatched portion) is performed on white paper.

The printing operation, in which K ink (solid black portion) is printed over a region printed with fluorescent pink ink (diagonally hatched portion), is repeated in the second pass and the third pass. The region in which printing in a constant state of this repetition is performed is the region 1202 of FIG. 12. From the above, in the region 1202 which is in a constant state, the fluorescent pink ink is first printed on the printing medium and becomes a lower layer, and K ink is later printed and becomes an upper layer on the printing medium.

For descriptive purposes, the control of the printing order of ink and the ink layers to be formed have been explained assuming that all the target nozzles eject ink. However, in practice, depending on the color—fluorescent pink ink and K ink—to be printed, printing duty varies, respectively. The printing duty for each ink in the present embodiment for the W-M-K line of the three-dimensional color shape of FIG. 8 is illustrated in FIG. 10B. That is, printing duty is determined so that the fluorescent pink ink increases as it approaches primary M from the white point W and K ink increases from primary M to the black point K.

FIG. 13B is a diagram illustrating all combinations of the printing states of the ink layers on the printing medium when the division printing control of FIG. 12 is performed by the printing duty illustrated in FIG. 10B. As illustrated in FIG. 13B, a state in which two layers are overlapped with the fluorescent pink ink serving as a lower layer and the K ink serving as an upper layer, a state in which only one layer of the fluorescent pink ink is present, and a state in which only one layer of the K ink is present are all of the possible combinations. As described above, in the present embodiment, the printing order is controlled so that the fluorescent pink ink is mixed into the same ink layer as another ink or becomes a lower layer on the printing medium.

Figure 14:
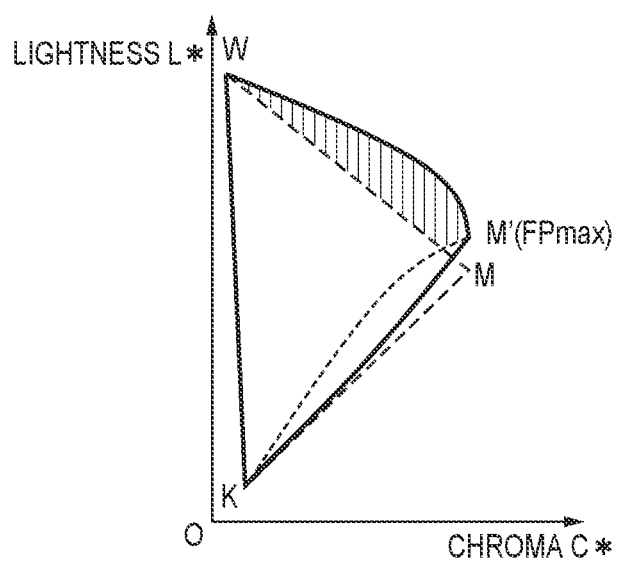
FIG. 14 is a diagram for explaining a color reproduction gamut of division printing control.

FIG. 14 is a diagram for explaining a color reproduction gamut of division printing control in the present embodiment. The color region of the dark portion according to the conventional printing control is indicated by a dotted line M'-K, and the color region of the dark portion according to the printing control according to the present embodiment is indicated by a bold line M'-K. As illustrated in FIG. 14, the dotted line M'-K is curved with the void protruding upward carving into the region from the bottom, whereas the bold line M'-K according to the printing control of the present embodiment is close to a straight line. In other words, according to the division printing control of the present embodiment, it is possible to suppress the above-described "carving" and prevent the narrowing of the color region of the dark portion.

Figure 15:
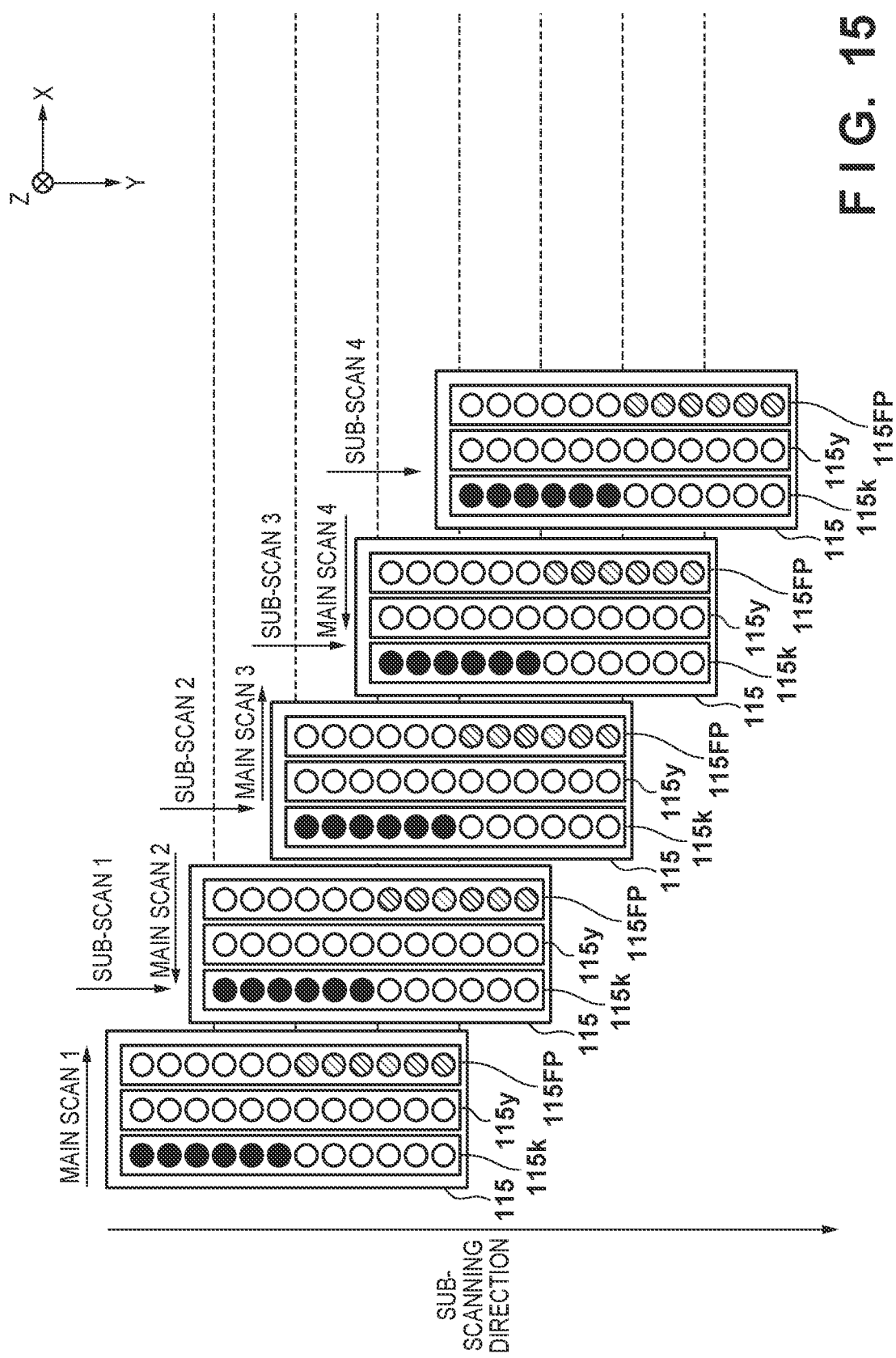
FIG. 15 is a diagram illustrating an example of printing with two passes for each ink.

In the division printing control of the present embodiment, a case where the printhead 115 is divided into 2, conveyed by ½ nozzle width per main scan, and the number of scans (number of passes) is 2 has been described. However, the number of passes may not necessarily coincide with the number of divisions, and the number of passes may be larger than the number of divisions for each ink. For example, FIG. 15 is a diagram illustrating an example in which the printhead 115 is divided into two, conveyed by ¼ nozzle width per main scan, and the number of passes is 4. As illustrated in FIG. 15, the printhead 115 as a whole has four passes of printing, but the printing has two passes of fluorescent pink ink and K ink, respectively. With such a configuration, it is possible to reduce the band unevenness caused by the non-uniformity or the misalignment of the nozzles of the printhead 115 and to perform high-quality printing.

As an image formation by ink on a printing medium, a division control in which a range of the nozzles to be used in the printhead 115 is equally divided into two groups of upper and lower portions and then controlled has been described. The division printing control of the present embodiment need only be able to control the order in which the ink to be printed lands. Therefore, the division method does not be an equal division, and for example, a division such that K ink is set to ⅔ and fluorescent pink ink is set to ⅓ may be performed. With such a configuration, printing can be performed at a higher speed when performing printing in which more K ink is used. Further, the number of divisions need not be 2, it may be 3 or more. By setting the number of divisions to 3, for example, the nozzles may be assigned such that the fluorescent pink ink is the lowermost layer on the printing medium, the K ink is an intermediate layer, and clear ink for overcoating is the uppermost layer. Dividing into three as such, for example, not only prevents the narrowing of the color region of the dark portion of fluorescent pink ink, but also makes it possible to perform other image quality control, such as gloss control, in parallel.

Figure 16:
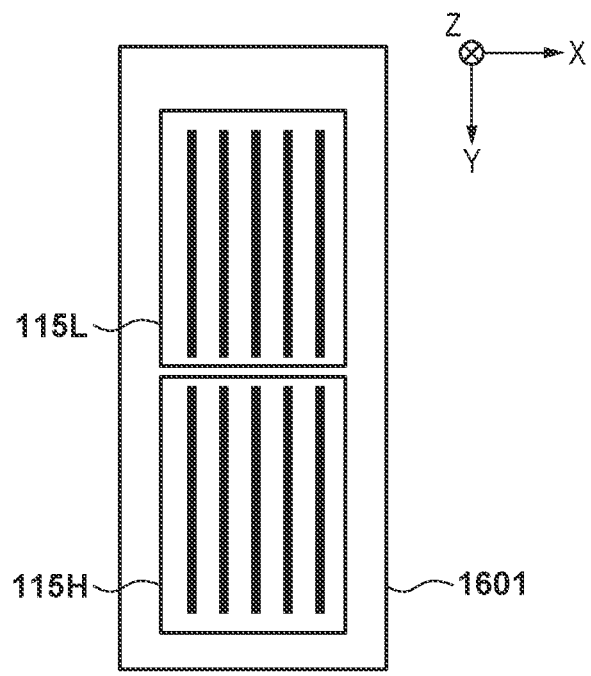
FIG. 16 is a diagram illustrating another example of a printhead.

Although an example in which division is performed within one printhead 115 has been described, printing may be performed using, for example, two printheads where the printheads are assigned such that one is a preceding printhead and the other is a subsequent printhead. FIG. 16 is a diagram for explaining a printhead unit that uses two printheads. A printhead unit 1601 includes a printhead 115H used for printing on the upstream side in the sub-scanning direction and a printhead 115L used for printing on the downstream side. By using a plurality of printheads as described above, high-speed printing in full nozzle width becomes possible for the respective printheads.

Further, with control different from the division printing control described in the present embodiment, it may be possible to execute ink landing order control. For example, printing may be performed by fluorescent pink ink in the odd-numbered print scanning, and printing may be performed by K ink in the even-numbered print scanning. With such a configuration, variations in the frequency of use of the nozzle are reduced, and the life of the printhead 115 can be extended.

Second Embodiment

Hereinafter, a second embodiment will be described with reference to points different from the first embodiment. In the present embodiment, printing control is performed so as to prevent narrowing in the color region of the dark portion while expanding the color gamut in the color region of the light portion by taking advantage of the light emission characteristics of the fluorescent pink ink.

In the present embodiment, in the color region of the light portion, the fluorescent pink ink is printed so as to be mixed into the same ink layer or be in an upper layer on the printing medium with respect to another subtractive color mixture ink, thereby realizing an expansion of the color gamut, which takes advantage of light emission. Further, in the color region of the dark portion, the fluorescent pink ink is printed so as to be mixed into the same ink layer or be in a lower layer on the printing medium with respect to the light emission suppressing ink, thereby reducing the influence of light emission and preventing narrowing of the color region of the dark portion.

Figure 29:
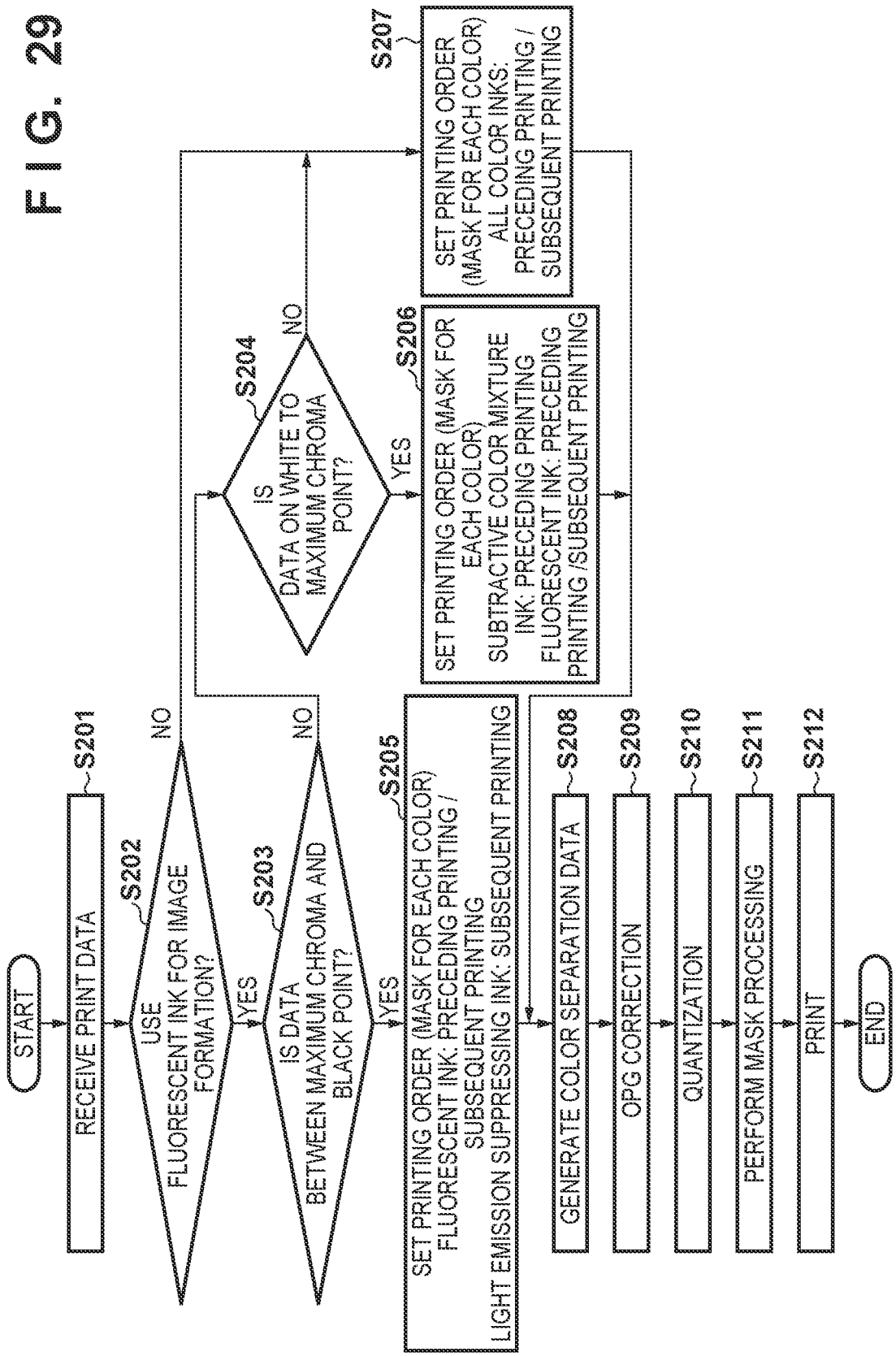
FIG. 29 is a flowchart illustrating a printing control process.

FIG. 29 is a flowchart illustrating a printing control process in the present embodiment. The process of FIG. 29 is realized, for example, by the CPU 111 of the printing apparatus 108 reading a program stored in the ROM 113 into the RAM 112 and executing the program. In the present embodiment, in the color region of the light portion, the fluorescent pink ink is controlled and printed to be mixed or be in an upper layer on the printing medium with respect to another subtractive color mixture ink, thereby realizing an expansion of the color gamut, which takes advantage of light emission. Further, in the color region of the dark portion, the fluorescent pink ink is controlled and printed to be mixed or be in a lower layer on the printing medium with respect to the light emission suppressing ink, thereby reducing the influence of light emission and preventing narrowing of the color region of the dark portion.

In step S201, the CPU 111 receives print data transmitted from the PC 101. In step S202, the CPU 111 determines whether or not to use fluorescent ink for image formation. If it is determined to use fluorescent ink, the process proceeds to step S203, and if it is determined to not use fluorescent ink, the process proceeds to step S207.

In step S203, the CPU 111 determines, for each pixel, a position in the input RGB color space from the received print data. That is, the CPU 111 determines whether or not the pixels of the print data are positioned between the maximum chroma points to the black point on the surface of the RGB color space. If it is determined that a pixel is positioned between the maximum chroma point and the black point on the surface of the RGB color space, the process proceeds to step S205. Meanwhile, if it is determined that a pixel is not positioned between the maximum chroma point and the black point on the surface of the RGB color space, the process proceeds to step S204.

In step S205, the CPU 111 sets a mask for controlling the printing order for each ink color. In step S205, the CPU 111 sets preceding and subsequent printing masks for printing the upstream side and downstream side together as a whole for the fluorescent ink. Also, the CPU 111 sets a subsequent printing mask for downstream printing of light emission suppressing ink. In addition, the CPU 111 sets preceding and subsequent printing masks for printing the upstream side and downstream side together as a whole for other inks. After step S205, the process proceeds to step S208.

In step S204, the CPU 111 determines, for each pixel, a position in the input RGB color space from the received print data. That is, the CPU 111 determines whether or not the pixels of the print data are positioned between the maximum chroma points to the white point on the surface of the RGB color space. If it is determined that a pixel is positioned between the maximum chroma point and the white point on the surface of the RGB color space, the process proceeds to step S206. Meanwhile, if it is determined that a pixel is not positioned between the maximum chroma point and the white point on the surface of the RGB color space, the process proceeds to step S207.

In step S206, the CPU 111 sets a mask for controlling the printing order for each ink color. In step S206, the CPU 111 sets preceding and subsequent printing masks for printing the upstream side and downstream side together as a whole for the fluorescent ink. Also, the CPU 111 sets a preceding printing mask for upstream printing of subtractive color mixture ink. In addition, the CPU 111 sets preceding and subsequent printing masks for printing the upstream side and downstream side as a whole for other inks. After step S206, the processing proceeds to step S208.

In step S207, the CPU 111 sets preceding and subsequent printing masks for printing the upstream side and downstream side as a whole for ink of all colors. Steps S203 to S207 are repeated for each pixel.

In step S208, the CPU 111 generates color separation data from the print data received in step S201. In step S209, the CPU 111 performs OutPutGamma correction according to the dot coverage on the printing medium. In step S210, the CPU 111 performs the quantization process. As a result of the quantization process, binary data corresponding to ON/OFF of dots in the output resolution is generated. In step S211, the CPU 111 compares the quantized data with the mask for each color set in step S205, S206, or S207 to determine the nozzles used for printing in each scan. In step S212, the CPU 111 scans the carriage and controls the printhead 115 to print dots from a defined nozzle.

<Control of Ink Printing Order>

In the present embodiment, control of the printing order of the fluorescent pink ink different between the color region of the light portion and the color region of the dark portion is performed. In the present embodiment, control of the ink printing order is performed based on the nozzle division printing of the printhead 115 of FIG. 18 and the color separation of FIG. 22B and FIG. 22C.

Figure 17:
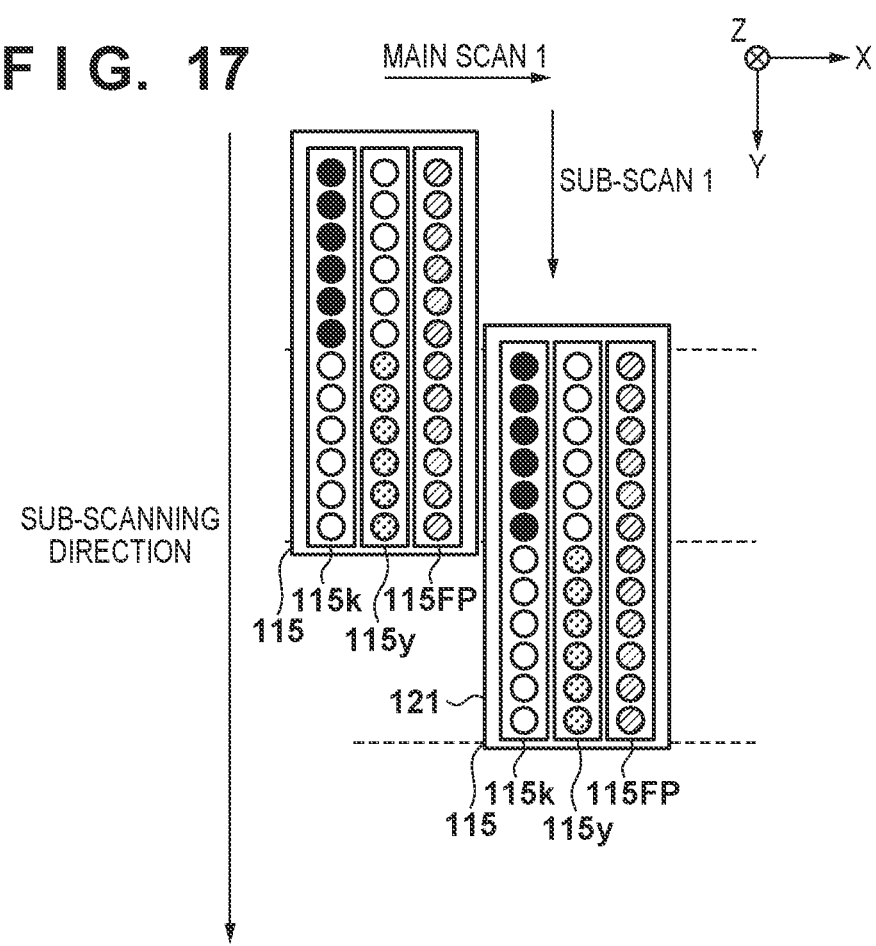
FIG. 17 is a diagram for explaining printhead nozzle division.

FIG. 17 is a diagram for explaining the nozzle division of the printhead 115 according to the present embodiment. Here, as an example, fluorescent pink ink, K ink serving as a light emission suppressing ink, and Y ink serving as another subtractive color mixture ink will be described. As illustrated in FIG. 17, for each ink, the following nozzle division is performed. For the fluorescent pink ink nozzles 115FP, as indicated by diagonal lines, a full row of nozzles is used. For the K ink nozzles 115K, nozzles which are ½ the width of the full row of nozzles on a downstream side in the conveyance direction indicated by blackening are used. For the Y ink nozzles 115Y, nozzles which are ½ the width of the full row of nozzles on an upstream side in the conveyance direction indicated by dot hatching are used.

Figure 22A:
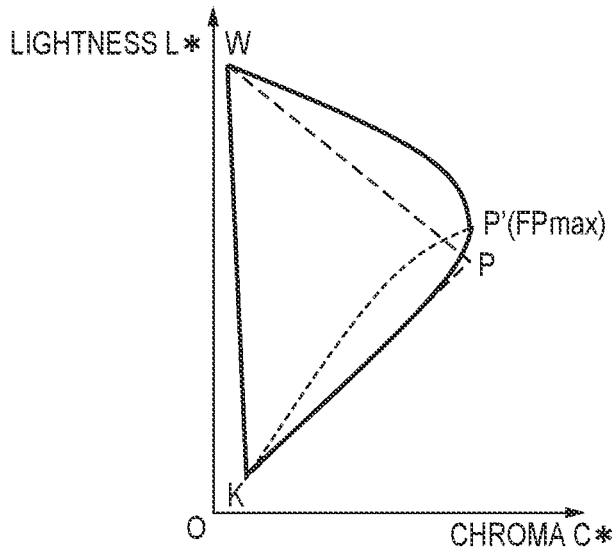
FIGS. 22A to 22C are diagrams for explaining a color reproduction gamut of division printing control.
Figure 22B:
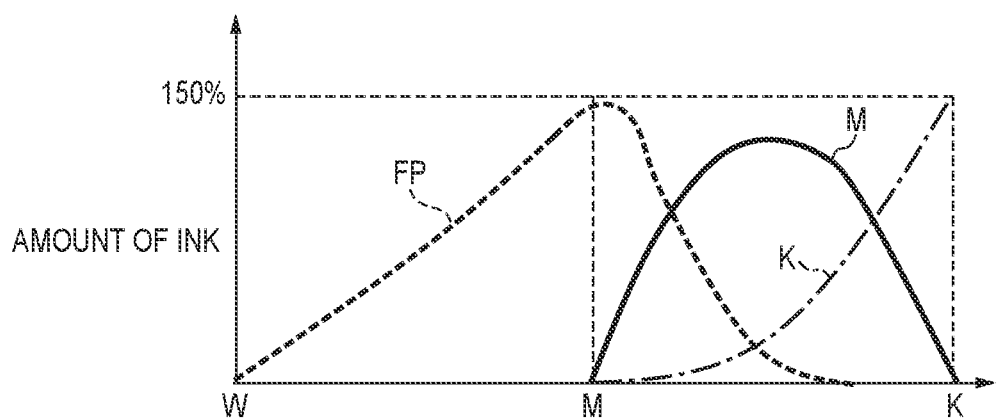

FIG. 22B is a diagram illustrating the printing duty (color separation) for each ink for W-M-K line of the three-dimensional color shape of FIG. 8. As illustrated in FIG. 22B, fluorescent pink ink increases as it approaches primary M from the white point W and fluorescent pink ink decreases from the primary M to the black point K. From the primary M, M ink increases as a color component of a color region in a dark portion that replaces the fluorescent pink ink, reaches its peak, and then decreases as it approaches the black point K. K ink gradually increases from the primary M to the black point K. In this way, the printing duty of W-M-K line is determined.

Figure 22C:
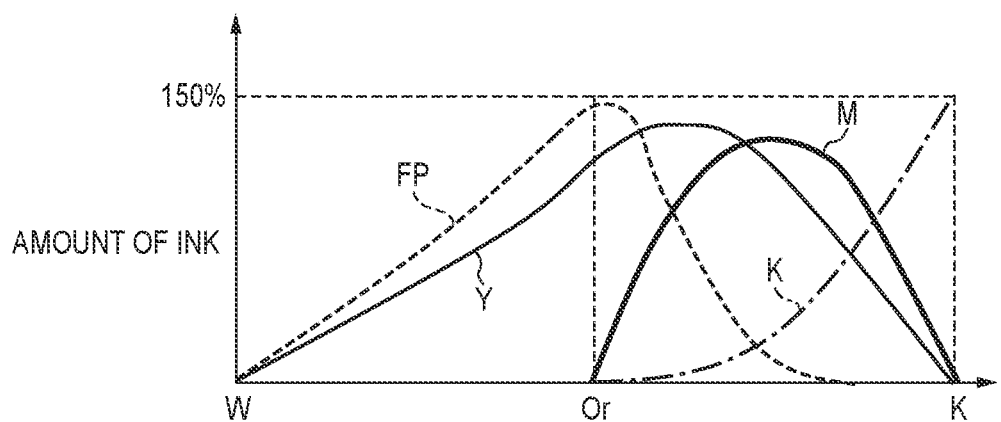

FIG. 22C is a diagram illustrating the printing duty for each ink for W-Or-K line of the three-dimensional color shape of FIG. 8. As illustrated in FIG. 22C, fluorescent FP ink and Y ink increases as it approaches primary Or from the white point W and fluorescent FP ink and Y ink decreases from the primary Or to the black point K. From the primary Or, M ink increases as a color component of a dark portion that replaces the fluorescent pink ink, reaches its peak, and then decreases as it approaches the black point K. K ink gradually increases from the primary M to the black point K. In this way, the printing duty of W-Or-K line is determined.

In the present embodiment, in order to reduce the emission influence in the color region of the dark portion and prevent the narrowing of the region, in addition to the control of the printing order of the fluorescent pink ink, the amount of fluorescent ink to be applied in the color region of the dark portion is suppressed. In other words, in the color region of the dark portion, the amount of fluorescent pink ink to be applied is suppressed, and by using M ink which is a subtractive color mixture ink, the scope of influence of light emission in the color region of the dark portion can be limited.

As illustrated in FIG. 22B and FIG. 22C, the light emission suppressing ink K is not used from the white point W to the primary, which is a color region of the light portion. On the other hand, from the primary to the black point K, which is a color region of the dark portion, the light emission suppressing ink K is used.

In the present embodiment, the printing order of the fluorescent pink ink and the other inks is different between the white point to the primary and the primary to the black point due to the nozzle division of FIG. 17 and the color separation of FIGS. 22B and 22C. In other words, from the white point to the primary, the fluorescent pink ink is printed so as to be mixed into the same ink layer or be in an upper layer on the printing medium with respect to the Y ink which is another subtractive color mixture ink. Meanwhile, from the primary to the black point, the fluorescent pink ink is printed so as to be mixed into the same ink layer or be in a lower layer on the printing medium with respect to the K ink which is a light emission suppressing ink.

<Control of Ink Printing Order from White Point W to Primary>

FIG. 18 is a diagram for explaining the printhead 115 and the printing process of a division printing control on a printing medium using the Y ink nozzles 115Y and the fluorescent pink ink nozzles 115FP. Here, for descriptive purposes, two types of ink, fluorescent pink ink which emits light and Y ink which is another subtractive color mixture ink will be given, and a case where ink is ejected from all the target nozzles will be described.

FIG. 18 is a diagram for explaining division printing control in the case where fluorescent pink ink is printed first to form it in a lower layer on the printing medium, and Y ink is printed later to form it on an upper layer on the printing medium. The nozzles of the printhead 115 are used by dividing it vertically along the sub-scanning direction. For the fluorescent pink ink nozzles 115FP, as indicated by diagonal lines, a full row of nozzles is used. Also, for the Y ink nozzles 115Y, nozzles which are ½ the width of the full row of nozzles on an upstream side in the conveyance direction indicated by dot hatching are used.

The printing operation will be described in detail. In a forward main scan (1), on the downstream side of the printhead 115, printing is performed with a width of ½ the full row of nozzles using fluorescent pink ink. At that time, on the upstream side, printing is performed with a width of ½ the full row of nozzles using Y ink and fluorescent pink ink. Subsequently, sub-scan (1), which is conveyance of ½ the width of the full row of nozzles, is performed. The position of the printhead after executing a sub-scan (1) is a position 1801. In the upstream portion of a backward main scan (2), the fluorescent pink ink and Y ink are printed first, while being mixed into the same ink layer, on a blank sheet portion of the printing medium. In the downstream portion of the backward main scan (2), fluorescent pink ink is printed subsequently over the printing medium on which the fluorescent pink ink and Y ink have been previously printed in the main scan (1). By repeating this series of operations, printing is performed on the entire printing medium. Incidentally, in FIG. 18, a region 1802 indicates a region where the printing neither starts nor ends but is in a constant state of the above repetition. After the printing medium is conveyed by the sub-scan (2), in the downstream portion of a forward main scan (3), fluorescent pink ink is printed subsequently over the printing medium on which the fluorescent pink ink and Y ink have been previously printed. Hereinafter, the process is repeated in the same manner.

FIG. 19A is a diagram for explaining printing states on a printing medium attained by the division printing operation of FIG. 18. The printing state of a first pass is as illustrated in a printing state 1901. The diagonally hatched portion indicates the printing region for fluorescent pink ink, and the portion hatched in a vertical and horizontal grid indicates the printing region in which both the fluorescent pink ink and the Y ink have been mixed into the same ink layer. As illustrated in the printing state 1901, on the upstream side of the first pass, the printing of fluorescent pink ink and Y ink in which they are mixed into the same ink layer is performed by the forward main scan (1) on white paper as illustrated in the portion hatched in a vertical and horizontal grid. Further, on the downstream side of the first pass, printing with fluorescent pink ink is performed on white paper as illustrated in the diagonally hatched portion.

A printing state 1902 is a state in which printing of a second pass is performed over the printing of the first pass. As illustrated in the printing state 1902, on the downstream side in the second pass, printing with fluorescent pink ink (diagonally hatched portion) is performed by the backward main scan (2) over the region printed in advance in the first pass with fluorescent pink ink and Y ink (portion hatched in a vertical and horizontal grid). Further, on the upstream side in the second pass, mixed printing (portion hatched in a vertical and horizontal grid) is performed on white paper in the same ink layer using the fluorescent pink ink and the Y ink.

The printing state of a third pass is as illustrated in a printing state 1903. As illustrated in the printing state 1903, on the downstream side in the third pass, printing with fluorescent pink ink (diagonally hatched portion) is performed by the forward main scan (3) over the region printed in advance in the second pass with fluorescent pink ink and Y ink in which they are mixed into the same ink layer (portion hatched in a vertical and horizontal grid).

The printing operation in which the fluorescent pink ink is printed (diagonally hatched portion) over the region printed with fluorescent pink ink and Y ink in which they are mixed into the same ink layer (portion hatched in a vertical and horizontal grid) is repeated in the second pass and the third pass. The region in which printing in a constant state of this repetition is performed is the region 1802 of FIG. 18. From the above, in the region 1802 which is in a constant state, the fluorescent pink ink and Y ink are first printed on the printing medium and become a lower layer, and fluorescent pink ink is later printed and becomes an upper layer on the printing medium.

For descriptive purposes, the control of the printing order of ink and the ink layers to be formed have been explained assuming that all the target nozzles eject ink. However, in practice, depending on the color—fluorescent pink ink and Y ink—to be printed, printing duty varies, respectively. The printing duty for each ink in the present embodiment for the W-Or-K line of the three-dimensional color shape of FIG. 8 is determined as illustrated in FIG. 22C.

FIG. 19B is a diagram illustrating all combinations of the printing states of the ink layers on the printing medium when the division printing control of FIG. 18 is performed by the printing duty illustrated in FIG. 22C. As illustrated in FIG. 19B, a state in which two layers are overlapped with the Y ink serving as a lower layer and the fluorescent pink ink serving as an upper layer, a state in which two layers or only one layer of the fluorescent pink ink is present, and a state in which only one layer of the Y ink is present are all of the possible combinations. As described above, in the present embodiment, the printing order is controlled so that in a color region of the light portion, the fluorescent pink ink is mixed into the same ink layer as another the subtractive color mixture ink or becomes an upper layer on the printing medium. As a result, it is possible to realize an expansion of the color gamut, which takes advantage of light emission.

<Control of Ink Printing Order from Primary to Black Point K>

Figure 20:
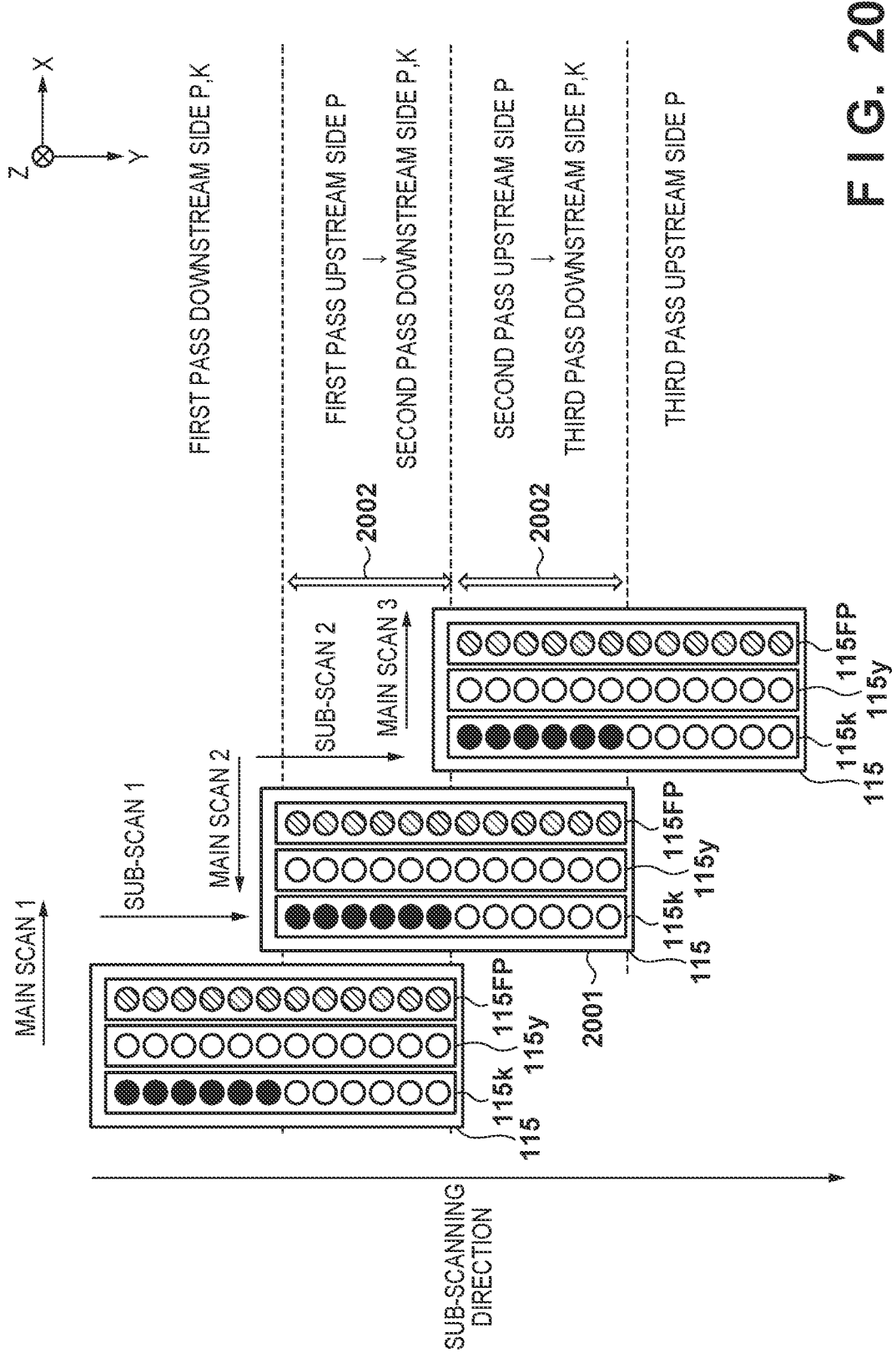
FIG. 20 is a diagram for explaining a printing process of a division printing control.

FIG. 20 is a diagram for explaining division printing control in the case where fluorescent pink ink is printed first to form it in a lower layer on the printing medium, and K ink is printed later to form it on an upper layer on the printing medium. The nozzles of the printhead 115 are used by dividing it vertically along the sub-scanning direction. For the fluorescent pink ink nozzles 115FP, as indicated by diagonal lines, a full row of nozzles is used. For the K ink nozzles 115K, nozzles which are ½ the width of the full row of nozzles on a downstream side in the conveyance direction indicated by blackening are used.

The printing operation will be described in detail. In a forward main scan (1), on the upstream side of the printhead 115, printing is performed with a width of ½ the full row of nozzles using fluorescent pink ink. At that time, on the downstream side, printing is performed with a width of ½ the full row of nozzles using K ink and fluorescent pink ink. Subsequently, sub-scan (1), which is conveyance of ½ the width of the full row of nozzles, is performed. The position of the printhead on the printing medium after executing a sub-scan (1) is a position 2001. In the upstream portion of a backward main scan (2), the fluorescent pink ink is printed first on a blank sheet portion of the printing medium. In the downstream portion of the backward main scan (2), fluorescent pink ink and K ink are mixed and printed subsequently over a region of the printing medium on which the fluorescent pink ink has been previously printed in the main scan (1). By repeating this series of operations, printing is performed on the entire printing medium. Incidentally, in FIG. 20, a region 2002 indicates a region which is not where the printing starts or ends but is in a constant state of the above repetition. After the printing medium is conveyed by the sub-scan (2), in the downstream portion of a forward main scan (3), fluorescent pink ink and K ink are mixed and printed subsequently over the printing medium on which the fluorescent pink ink has been previously printed. Hereinafter, the process is repeated in the same manner.

FIG. 21A is a diagram for explaining printing states on a printing medium attained by the division printing operation of FIG. 20. The printing state of a first pass is as illustrated in a printing state 2101. The diagonally hatched portion indicates the printing region for fluorescent pink ink, and the portion hatched in a diagonal grid indicates the printing region in which both the fluorescent pink ink and the K ink have been mixed into the same ink layer. As illustrated in the printing state 2101, on the downstream side of the first pass, mixed printing (portion hatched in a diagonal grid) is performed by a forward main scan (1) on white paper in the same ink layer using the fluorescent pink ink and the K ink. Further, on the upstream side in the first pass, printing with fluorescent pink ink (diagonally hatched portion) is performed on white paper.

A printing state 2102 is a state in which printing of a second pass is subsequently performed over the printing of the first pass. As illustrated in the printing state 2102, on the downstream side in the second pass, printing in which both fluorescent pink ink and K ink are mixed into the same ink layer (portion hatched in a diagonal grid) is performed by the backward main scan (2) over the region printed in advance in the first pass with fluorescent pink ink (diagonally hatched portion). Further, on the upstream side in the second pass, printing with fluorescent pink ink (diagonally hatched portion) is performed on white paper.

The printing state of a third pass is as illustrated in a printing state 2103. As illustrated in the printing state 2103, on the downstream side in the third pass, printing in which fluorescent FP ink and K ink are mixed into the same ink layer (portion hatched in a diagonal grid) is performed by the forward main scan (3) over the region printed in advance in the second pass with fluorescent pink ink (diagonally hatched portion).

The printing operation in which printing in which fluorescent pink ink and K ink are mixed into the same ink layer (portion hatched in a diagonal grid) is performed over a region on which the fluorescent pink ink has been printed (diagonally hatched portion) is repeated in the second pass and the third pass. The region in which printing in a constant state of this repetition is performed is the region 2002 of FIG. 20. From the above, in the region 2002 in a steady state, the fluorescent pink ink is first printed on the printing medium to become a lower layer, and the fluorescent pink ink and the K ink are subsequently mixed and printed in the same ink layer to become an upper layer on the printing medium.

For descriptive purposes, the control of the printing order of ink and the ink layers to be formed have been explained assuming that all the target nozzles eject ink. However, in practice, depending on the color—fluorescent pink ink and K ink—to be printed, printing duty varies, respectively. The printing duty for each ink in the present embodiment for the W-M-K line or the W-Or-K line of the three-dimensional color shape of FIG. 8 is determined as illustrated in FIG. 22B or FIG. 22C.

FIG. 21B is a diagram illustrating all combinations of the printing states of the ink layers on the printing medium when the division printing control of FIG. 20 is performed by the printing duty illustrated in FIG. 22B or FIG. 22C. As illustrated in FIG. 21B, a state in which two layers are overlapped with the fluorescent pink ink serving as a lower layer and the K ink serving as an upper layer, a state in which two layers or only one layer of the fluorescent pink ink is present, and a state in which only one layer of the K ink is present are all of the possible combinations. As described above, in the present embodiment, the printing order is controlled so that the fluorescent pink ink is mixed into the same ink layer as light emission suppressing ink or becomes a lower layer on the printing medium.

As described above, in the present embodiment, the printing order of the fluorescent pink ink and the other inks is controlled to be different between the white point to the primary and the primary to the black point. From the white point to the primary, the printing order is controlled such that the fluorescent pink ink is mixed into the same ink layer or is in an upper layer on the printing medium with respect to another subtractive color mixture ink. Meanwhile, from the primary to the black point, the printing order is controlled such that the fluorescent pink ink is mixed into the same ink layer or is in a lower layer on the printing medium with respect to the light emission suppressing ink.

FIG. 22A is a diagram for explaining a color reproduction gamut of division printing control in the present embodiment. The color region of the dark portion according to the conventional printing control is indicated by a dotted line P'-K, and the color region of the dark portion according to the present embodiment is indicated by a bold line P'-K. As illustrated in FIG. 22A, the dotted line P'-K is curved with the void protruding upward carving into the region from the bottom, whereas the bold line P'-K according to the printing control of the present embodiment is close to a straight line. In other words, according to the division control of the present embodiment, it is possible to suppress the above-described "carving" and prevent the narrowing of the color region of the dark portion.

As described above, in the present embodiment, in the case of the printing medium in which image formation by the ink deposition model is performed, control of the printing order for each ink is performed. In other words, from the white point to the primary, the printing order is controlled such that the fluorescent pink ink is mixed into the same ink layer or is printed in an upper layer on the printing medium with respect to another subtractive color mixture ink. Meanwhile, from the primary to the black point, the printing order is controlled such that the fluorescent pink ink is mixed into the same ink layer or is printed in a lower layer on the printing medium with respect to the light emission suppressing ink. Thus, it is possible to realize the expansion of the color gamut in the color region of the light portion and to prevent the narrowing of the color region of the dark portion.

Third Embodiment

Hereinafter, a third embodiment will be described with reference to points different from the first and second embodiments. In the present embodiment, the printing control having the same effect as that of the second embodiment described in the printing medium of the ink deposition model is performed on the printing medium of the ink permeation model.

In the present embodiment, for example, coated paper is used as a printing medium, and pigment ink is used as a coloring material. The coated paper in the present embodiment is configured by two layers: a pulp layer of a base material and an ink receiving layer composed of silica particles. The ink receiving layer is coated by pulp whose base material is silica particles having a coarse particle diameter, and there are gaps between the silica particles and, further, fine pores of the silica particles themselves, and the dye ink is permeated into and held by the large and small capillary tubes constituted by these. In the present embodiment, the image formation process by the ink permeation model is performed.

<Image Formation Process on Printing Medium: Ink Permeation Model>

An image formation process on a printing medium will be described with reference to FIGS. 7A to 7D. FIGS. 7A to 7D are diagrams for explaining an image formation process in an ink permeation model in which ink landed on a printing medium permeates a printing medium. This applies to an image formation process in a case where the pigment ink is printed on plain paper having gaps larger than that of the coloring material particles, or a case where the dye ink is printed on plain paper or glossy paper having gaps smaller than that of the coloring material particles, for example. The ink permeation model is a model of an image formation process in which a coloring material penetrates the printing medium below the surface of the printing medium to form an ink layer below the surface of the printing medium because the coloring material particle size contributing to color development in the ink is smaller than the gaps on the surface of the printing medium.

Image formation is performed as illustrated in FIGS. 7A to 7D.

As illustrated in FIG. 7A, pigment ink S1 is supplied onto the printing medium P. Then, as illustrated in FIG. 7B, the pigment ink S1 lands on the printing medium P and permeates the printing medium. Further, subsequent pigment ink S2 is supplied. Then, as illustrated in FIG. 7C, the pigment ink S2 lands on the pigment ink S1 which has already permeated and occupies the gaps in the surface layer of the printing medium. Then, as illustrated in FIG. 7D, since the dye ink S1 that has already been printed occupies the gaps in the surface layer of the printing medium, the dye ink S2 bypasses it and penetrates a lower layer of the printing medium. As a result, layers are formed in which an upper layer of the printing medium is a dye ink S1 and a lower layer of the printing medium is a dye ink S2. Thus, in the ink permeation model, the relationship between the landing order and the image forming layer order is the reverse of the ink deposition model, and image formation is performed in which the subsequent dots remain in a lower layer of the printing medium.

Similarly to the second embodiment, in the present embodiment, printing order control is performed so as to prevent narrowing in the color region of the dark portion while expanding the color gamut in the color region of the light portion by taking advantage of the light emission characteristics of the fluorescent pink ink. In the color region of the light portion, the fluorescent pink ink is printed so as to be mixed into the same ink layer or be in an upper layer of the printing medium with respect to another subtractive color mixture ink, thereby realizing an expansion of the color gamut, which takes advantage of light emission. Further, in the color region of the dark portion, the fluorescent pink ink is printed so as to be mixed into the same ink layer or be in a lower layer of the printing medium with respect to the light emission suppressing ink, thereby reducing the influence of light emission in the dark portion and preventing narrowing of the color region of the dark portion.

Hereinafter, differences from the second embodiment regarding the printing order control of the ink that occurs when the image formation process is different from that of the second embodiment will be described.

Figure 30:
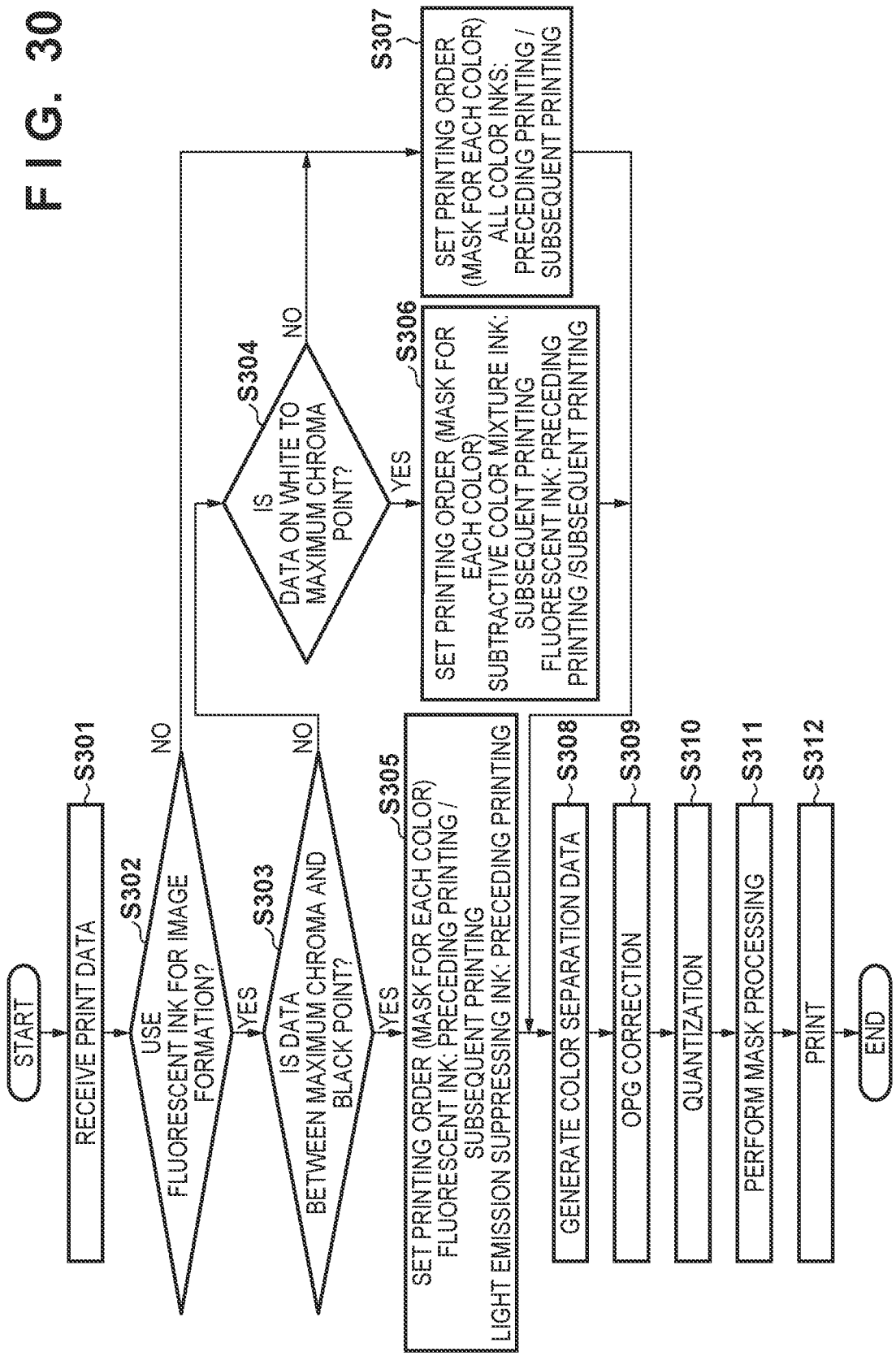
FIG. 30 is a flowchart illustrating a printing control process.

FIG. 30 is a flowchart illustrating a printing control process in the present embodiment. The process of FIG. 30 is realized, for example, by the CPU 111 of the printing apparatus 108 reading a program stored in the ROM 113 into the RAM 112 and executing the program. In the present embodiment, an ink permeation model different from the ink deposition model in the second embodiment is assumed. Therefore, as a result of the printing order and the printing, the layer order of the ink layer to be formed is opposite to that of the second embodiment. In the present embodiment, by controlling so that the printing order is reversed from that of the second embodiment, the layer order of the same ink layer as that of the second embodiment is realized.

The description for steps S301 to S304, S307, S308 to S312 of FIG. 30 are the same as that of steps S201 to S204, S207, S208 to S212 of FIG. 29; therefore, description thereof will be omitted.

When it is determined that the pixel is positioned at the maximum chroma points to the black point of the surface of the input RGB color space in step S303, in step S305, the CPU 111 sets a mask for controlling the printing order for each ink color. In step S305, the CPU 111 sets preceding and subsequent printing masks for printing the upstream side and downstream side as a whole for the fluorescent ink. Also, the CPU 111 sets a preceding printing mask for upstream printing of light emission suppressing ink. In addition, the CPU 111 sets preceding and subsequent printing masks for printing the upstream side and downstream side as a whole for other inks.

When it is determined that the pixel is positioned at the white point to the maximum chroma points of the surface of the input RGB color space in step S303, in step S306, the CPU 111 sets preceding and subsequent printing mask for printing the upstream side and downstream side as a whole for the fluorescent ink. Also, the CPU 111 sets a subsequent printing mask for downstream printing of subtractive color mixture ink. In addition, the CPU 111 sets preceding and subsequent printing masks for printing the upstream side and downstream side as a whole for other inks.

<Control of Ink Printing Order>

In the present embodiment, control of the printing order of the fluorescent pink ink different between the color region of the light portion and the color region of the dark portion is performed. In the present embodiment, control of the ink printing order is performed based on the nozzle division printing of the printhead 115 of FIG. 24 and the color separation of FIG. 22B and FIG. 22C.

Figure 23:
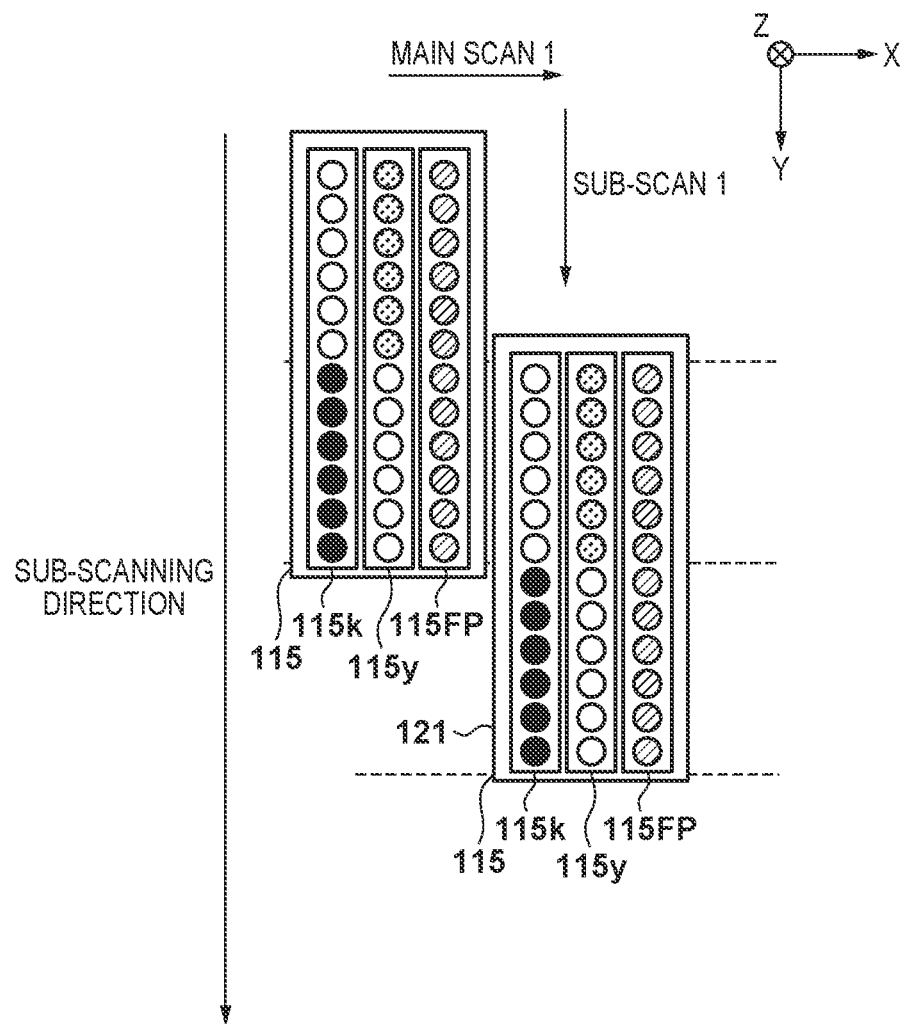
FIG. 23 is a diagram for explaining nozzle division of a printhead.

FIG. 23 is a diagram for explaining the nozzle division of the printhead 115 according to the present embodiment. Here, as an example, fluorescent pink ink, K ink serving as a light emission suppressing ink, and Y ink serving as another subtractive color mixture ink will be described. As illustrated in FIG. 23, for each ink, the following nozzle division is performed. For the fluorescent pink ink nozzles 115FP, as indicated by diagonal lines, a full row of nozzles is used. For the K ink nozzles 115K, nozzles which are ½ the width of the full row of nozzles on a downstream side in the conveyance direction indicated by blackening are used. For the Y ink nozzles 115Y, nozzles which are ½ the width on an upstream side in the conveyance direction indicated by dot hatching are used.

As illustrated in FIG. 22B and FIG. 22C, K ink which is light emission suppressing ink is not used from the white point W to the primary, which is a color region of the light portion. On the other hand, from the primary to the black point K, which is a color region of the dark portion, K ink which is light emission suppressing ink is used.

In the present embodiment, the printing order of the fluorescent pink ink and the other inks is different between the white point to the primary and the primary to the black point due to the nozzle division of FIG. 23 and the color separation of FIGS. 22B and 22C. In other words, from the white point to the primary, the fluorescent pink ink is printed so as to be mixed into the same ink layer or be in an upper layer of the printing medium with respect to the Y ink which is another subtractive color mixture ink. Meanwhile, from the primary to the black point, the fluorescent pink ink is printed so as to be mixed into the same ink layer or be in a lower layer of the printing medium with respect to the K ink which is a light emission suppressing ink.

<Control of Ink Printing Order from White Point W to Primary>

Figure 24:
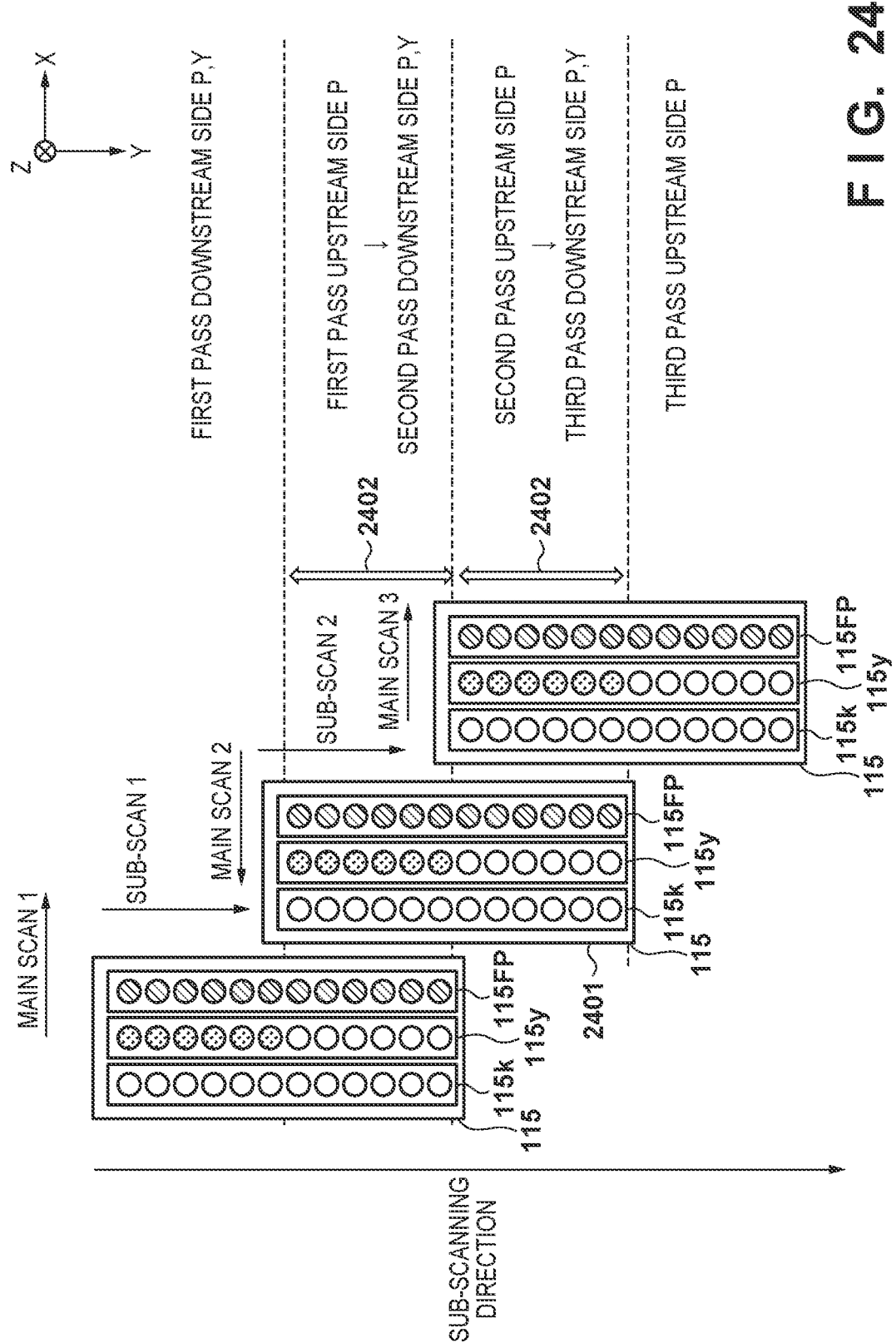
FIG. 24 is a diagram for explaining a printing process of a division printing control.

FIG. 24 is a diagram for explaining the printhead 115 and the printing process of a division printing control on a printing medium using the Y ink nozzles 115Y and the fluorescent FP ink nozzles 115FP. Here, for descriptive purposes, two types of ink, fluorescent pink ink which emits light and Y ink which is another subtractive color mixture ink will be given, and a case where ink is ejected from all the target nozzles will be described.

FIG. 24 illustrates division printing control in the case where fluorescent FP ink is printed first to form an ink layer in an upper layer of the printing medium, and Y ink is printed later to form it on a lower layer of the printing medium. The nozzles of the printhead 115 are used by dividing it vertically along the sub-scanning direction. For the fluorescent pink ink nozzles 115FP, as indicated by diagonal lines, a full row of nozzles is used. Also, for the Y ink nozzles 115Y, nozzles which are ½ the width of the full row of nozzles on a downstream side in the conveyance direction indicated by dot hatching are used.

The printing operation will be described in detail. In a forward main scan (1), on the upstream side of the printhead 115, printing is performed with a width of ½ the full row of nozzles using fluorescent pink ink. At that time, on the downstream side, printing is performed with a width of ½ the full row of nozzles using Y ink and fluorescent pink ink. Subsequently, sub-scan (1), which is conveyance of ½ the width of the full row of nozzles, is performed. The position of the printhead after executing the sub-scan (1) is a position 2401. In the upstream portion of a backward main scan (2), the fluorescent pink ink is printed precedingly on a blank sheet portion of the printing medium. In the downstream portion of the backward main scan (2), fluorescent pink ink and Y ink are mixed and printed subsequently in the same ink layer over the printing medium on which the fluorescent pink ink has been previously printed in the main scan (1). By repeating this series of operations, printing is performed on the entire printing medium. Incidentally, in FIG. 24, a region 2402 indicates a region where the printing neither starts nor ends but is in a constant state of the above repetition. After the printing medium is conveyed by the sub-scan (2), in the downstream portion of a forward main scan (3), fluorescent pink ink and Y ink are mixed and printed in the same ink layer subsequently over the printing medium on which the fluorescent pink ink has been previously printed. Hereinafter, the process is repeated in the same manner.

FIG. 25A is a diagram for explaining printing states on a printing medium attained by the division printing operation of FIG. 24. The printing state of a first pass is as illustrated in a printing state 2501. The diagonally hatched portion indicates the printing region for fluorescent pink ink, and the portion hatched in a vertical and horizontal grid indicates the printing region in which both the fluorescent pink ink and the Y ink have been mixed into the same ink layer. As illustrated in the printing state 2501, on the upstream side of the first pass, the printing of fluorescent pink ink is performed by the forward main scan (1) on white paper as illustrated in the diagonally hatched portion. Further, on the downstream side in the first pass, the mixed printing of the fluorescent pink ink and the Y ink to the same ink layer is performed on white paper as illustrated in the portion hatched in a vertical and horizontal grid.

A printing state 2502 is a state in which printing of a second pass is performed over the printing of the first pass. As illustrated in the printing state 2502, on the downstream side in the second pass, printing in which both fluorescent FP ink and Y ink are mixed into the same ink layer (portion hatched in a vertical and horizontal grid) is performed by the backward main scan (2) subsequently to the region printed in advance in the first pass with fluorescent pink ink (diagonally hatched portion). However, in the case of the ink permeation model, the precedingly printed dots occupy an upper layer of the printing medium, and the subsequent dots permeate a lower layer of the printing medium; therefore, on the printing medium, the region (diagonally hatched portion) printed in precedingly printed fluorescent pink ink occupies an upper layer of the printing medium. Further, on the upstream side in the second pass, printing with fluorescent pink ink (diagonally hatched portion) is performed on white paper.

The printing state of a third pass is as illustrated in a printing state 2503. As illustrated in the printing state 2503, on the downstream side in the third pass, printing in which fluorescent FP ink and Y ink are mixed into the same ink layer (portion hatched in a vertical and horizontal grid) is performed by the forward main scan (3) subsequently to the region printed in advance in the second pass with fluorescent pink ink (diagonally hatched portion). Again, as the printing state on the printing medium, the region printed in precedingly printed fluorescent pink ink (diagonally hatched portion) becomes dominant.

The printing operation in which fluorescent FP ink and Y ink are mixed and printed in the same ink layer (portion hatched in a vertical and horizontal grid) subsequent to a region on which the fluorescent pink ink has been printed (diagonally hatched portion) is repeated in the second pass and the third pass. The region in which printing in a constant state of this repetition is performed is the region 2402 of FIG. 24. From the above, in the region 2402, printing is performed so that the fluorescent pink ink is first printed and becomes an upper layer of the printing medium, and the fluorescent pink ink and the Y ink are subsequently printed to go under to a lower layer of the printing medium.

For descriptive purposes, the control of the printing order of ink and the ink layers to be formed have been explained assuming that all the target nozzles eject ink. However, in practice, depending on the color—fluorescent pink ink and Y ink—to be printed, printing duty varies, respectively. The printing duty for each ink in the present embodiment for the W-Or-K line of the three-dimensional color shape of FIG. 8 is determined as illustrated in FIG. 22C.

FIG. 25B is a diagram illustrating all combinations of the printing states of the ink layers on the printing medium when the division printing control of FIG. 24 is performed by the printing duty illustrated in FIG. 22C. As illustrated in FIG. 25B, a state in which two layers are overlapped with the Y ink serving as a lower layer and the fluorescent pink ink serving as an upper layer, a state in which two layers or only one layer of the fluorescent pink ink is present, and a state in which only one layer of the Y ink is present are all of the possible combinations. As described above, in the present embodiment, the printing order is controlled so that in a color region of the light portion, the fluorescent pink ink is mixed into the same ink layer as another the subtractive color mixture ink or becomes an upper layer of the printing medium. As a result, it is possible to realize an expansion of the color gamut, which takes advantage of light emission.

<Control of Ink Printing Order from Primary to Black Point K>

Figure 26:
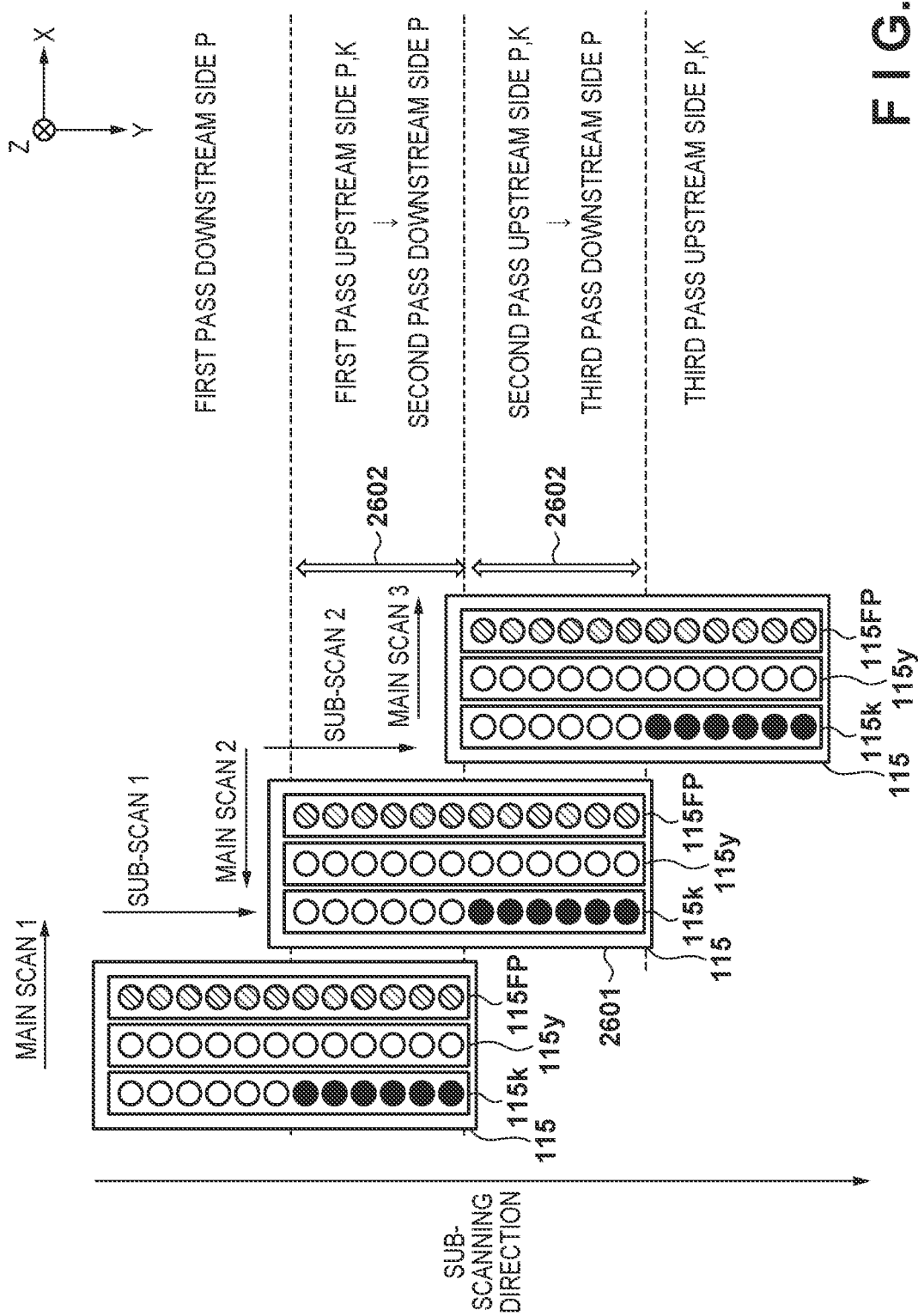
FIG. 26 is a diagram for explaining a printing process of a division printing control.

FIG. 26 is a diagram for explaining division printing control in the case where K ink is printed first to form an ink layer in an upper layer of the printing medium, and fluorescent FP ink is printed later to form it in a lower layer of the printing medium. The nozzles of the printhead 115 are used by dividing it vertically along the sub-scanning direction. For the nozzles for fluorescent FP ink (115FP) which is fluorescent ink, as indicated by diagonal lines, a full row of nozzles is used. For the nozzles for K ink 115K which is light emission suppressing ink, nozzles which are ½ the width of the full row of nozzles on an upstream side in the conveyance direction indicated by blackening are used.

The printing operation will be described in detail. In a forward main scan (1), on the upstream side of the printhead 115, printing is performed with a width of ½ the full row of nozzles using K ink and fluorescent pink ink. At that time, on the downstream side, printing is performed with a width of ½ the full row of nozzles using fluorescent pink ink. Subsequently, sub-scan (1), which is conveyance of ½ the width of the full row of nozzles, is performed. The position of the printhead on the printing medium after executing a sub-scan (1) is a position 2601. On the upstream side of a backward main scan (2), the fluorescent pink ink and K ink are printed precedingly, while being mixed into the same ink layer, on a blank sheet portion of the printing medium. On the downstream side of the backward main scan (2), fluorescent pink ink is printed subsequently over the printing medium on which the fluorescent pink ink and K ink have been previously printed mixed in the same ink layer in the main scan (1). By repeating this series of operations, printing is performed on the entire printing medium. Incidentally, in FIG. 26, a region 2602 indicates a region where the printing neither starts nor ends but is in a constant state of the above repetition. After the printing medium is conveyed by the sub-scan (2), in the downstream portion of a forward main scan (3), fluorescent pink ink is printed subsequently over the printing medium on which the fluorescent pink ink and K ink have been previously printed mixed in the same ink layer. Hereinafter, the process is repeated in the same manner.

FIG. 27A is a diagram for explaining printing states on a printing medium attained by the division printing operation of FIG. 26. The printing state of a first pass is as illustrated in a printing state 2701. The diagonally hatched portion indicates the printing region for fluorescent pink ink, and the portion hatched in a diagonal grid indicates the printing region in which both the fluorescent pink ink and the K ink have been mixed into the same ink layer. As illustrated in the printing state 2701, on the upstream side of the first pass, mixed printing (portion hatched in a diagonal grid) is performed by a forward main scan (1) on white paper in the same ink layer using the fluorescent pink ink and the K ink. Further, on the downstream side in the first pass, printing with fluorescent pink ink (diagonally hatched portion) is performed on white paper.

A printing state 2702 is a state in which printing of a second pass is performed subsequently to the printing of the first pass. As illustrated in the printing state 2702, on the downstream side in the second pass, printing with fluorescent pink ink (diagonally hatched portion) is performed by the backward main scan (2) subsequently to the region printed in advance in the first pass with fluorescent pink ink and K ink in which they are mixed into the same ink layer (portion hatched in a diagonal grid). However, in the ink permeation model, the first-printed ink layer occupies an upper layer of the printing medium, and the subsequent ink layer bypasses the first-printed ink and penetrates a lower layer of the printing medium; therefore, on the printing medium, a region in which first-printed fluorescent ink and K ink are mixed in the same ink layer occupies an upper layer of the printing medium. Further, on the upstream side in the second pass, mixed printing (portion hatched in a diagonal grid) is performed on white paper in the same ink layer using the fluorescent pink ink and the K ink.

The printing state of a third pass is as illustrated in a printing state 2703. As illustrated in the printing state 2703, on the downstream side in the third pass, printing with fluorescent pink ink (diagonally hatched portion) is performed by the forward main scan (3) subsequent to the region printed in advance in the second pass with fluorescent pink ink and K ink in which they are mixed into the same ink layer (portion hatched in a diagonal grid).

The printing operation in which the fluorescent pink ink is printed (diagonally hatched portion) subsequent to the region printed with fluorescent pink ink and K ink in which they are mixed into the same ink layer (portion hatched in a diagonal grid) is repeated in the second pass and the third pass. The region in which printing in a constant state of this repetition is performed is the region 2602 of FIG. 26. From the above, in the region 2602, since the ink layer that is first printed occupies a surface layer of the printing medium with respect to a subsequent ink layer, a region in which the fluorescent pink ink and the K ink are mixed and printed in the same ink layer becomes an upper layer of the printing medium. Then, the fluorescent pink ink subsequently permeates a lower layer of the printing medium.

For descriptive purposes, the control of the printing order of ink and the ink layers to be formed have been explained assuming that all the target nozzles eject ink. However, in practice, depending on the color—fluorescent pink ink and K ink—to be printed, printing duty varies, respectively. The printing duty for each ink in the present embodiment for the W-M-K line or the W-Or-K line of the three-dimensional color shape of FIG. 8 is as illustrated in FIG. 22B or FIG. 22C.

FIG. 27B is a diagram illustrating all combinations of the printing states of the ink layers on the printing medium when the division printing control of FIG. 26 is performed by the printing duty illustrated in FIG. 22B or FIG. 22C. As illustrated in FIG. 27B, a state in which two layers are overlapped with the fluorescent pink ink serving as a lower layer and the K ink serving as an upper layer, a state in which two layers or only one layer of the fluorescent pink ink is present, and a state in which only one layer of the K ink is present are all of the possible combinations. As described above, in the present embodiment, the printing order is controlled so that the fluorescent pink ink is mixed into the same ink layer as light emission suppressing ink or becomes a lower layer on the printing medium.

As described above, similarly to the second embodiment, even when the printing medium of the ink permeation model is used, the printing order of the fluorescent pink ink and the other inks can be controlled to be different from each other from the white point to the primary point and the primary to the black point. In other words, from the white point to the primary, the printing order is controlled such that the fluorescent pink ink is mixed or is in an upper layer on the printing medium with respect to another subtractive color mixture ink. Meanwhile, from the primary to the black point, the printing order is controlled such that the fluorescent pink ink is mixed into the same ink layer or is in a lower layer on the printing medium with respect to the light emission suppressing ink. Further, it is possible to achieve the same effect as the effect described in FIG. 22A.

In the above, a combination of coated paper and dye ink has been exemplified as a combination of a printing medium and ink to which an ink permeation model is applied. However, the combination in which the image formation process by the ink permeation model is realized is not limited thereto, and a combination of plain paper, Japanese paper, and art paper and pigment ink is also included. In the case of plain paper or Japanese paper, ink permeation occurs with the gaps between pulp fibers serving as large capillaries and the pulp itself serving as small capillaries. Similarly to coated paper, in the case of art paper, ink permeation occurs with gaps between silica grains serving as large capillaries and the silica grains themselves serving as small capillaries. Since the size of these gaps is sufficiently larger than the order of 100 [nm], which is a pigment coloring material particle diameter, an image formation process due to permeation is realized even with pigment ink.

As described above, even when the printing medium of the ink permeation model is used, control of the printing order for each ink is performed. In other words, from the white point to the primary, the printing order is controlled such that the fluorescent pink ink is mixed into the same ink layer or is printed in an upper layer on the printing medium with respect to another subtractive color mixture ink. Meanwhile, from the primary to the black point, the printing order is controlled such that the fluorescent pink ink is mixed into the same ink layer or is in a lower layer on the printing medium with respect to the light emission suppressing ink. Thus, it is possible to realize the expansion of the color gamut in the color region of the light portion and to prevent the narrowing of the color region of the dark portion.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-019238, filed Feb. 9, 2021, which is hereby incorporated by reference herein in its entirety.

What is claimed is:

1. A printing apparatus comprising:
a printing unit provided with nozzle rows in a conveyance direction of a printing medium and configured to move back and forth in a scanning direction that intersects the conveyance direction of the printing medium and perform printing of an image by applying ink droplets on the printing medium from nozzles of the printing unit, the printing unit comprising a nozzle row corresponding to fluorescent ink and a nozzle row corresponding to light emission suppressing ink that suppresses light emission of the fluorescent ink;
a control unit configured to control movement of the printing unit and conveyance of the printing medium such that an image is printed by a plurality of scans of the printing unit; and
a determination unit configured to, in a case where the fluorescent ink is used in the printing of the image, determine an order of printing by the fluorescent ink and printing by the light emission suppressing ink in the plurality of scans, wherein
the control unit performs the control of the movement of the printing unit and the conveyance of the printing medium based on the order determined by the determination unit, and
the determination unit determines the order of the printing by the fluorescent ink and the printing by the light emission suppressing ink such that the fluorescent ink is printed to be in a layer lower than the light emission suppressing ink in a region of a dark portion of the image.

2. The printing apparatus according to claim 1, wherein
the nozzle row corresponding to the fluorescent ink and the nozzle row corresponding to the light emission suppressing ink are each divided into a plurality of groups whose nozzles are adjacent to each other so as to correspond to each scan, and
the determination unit determines the order of the printing by the fluorescent ink and the printing by the light emission suppressing ink by setting whether or not to perform setting of a mask with respect to each divided group.

3. The printing apparatus according to claim 1, wherein
the printing unit comprises a nozzle row corresponding to another ink different from the fluorescent ink and the light emission suppressing ink,
the determination unit, in a case where the fluorescent ink is used in the printing of the image, determines an order of the printing by the fluorescent ink and printing by the other ink in the plurality of scans, and
the determination unit determines the order of the printing by the fluorescent ink and the printing by the other ink such that the fluorescent ink is printed to be in the same layer as the other ink or the fluorescent ink is printed to be in a layer higher than the other ink in a region of a light portion of the image.

4. The printing apparatus according to claim 3, wherein
the nozzle row corresponding to the other ink is divided into a plurality of groups whose nozzles are adjacent to each other so as to correspond to each scan, and
the determination unit determines the order of the printing by the fluorescent ink and the printing by the other ink by setting whether or not to perform setting of a mask with respect to each divided group.

5. The printing apparatus according to claim 3, wherein the region of the dark portion of the image is a color region between a maximum chroma point and a black point on a surface of a color space of the image.

6. The printing apparatus according to claim 5, wherein the region of the light portion of the image is a color region between a white point and the maximum chroma point on the surface of the color space of the image.

7. The printing apparatus according to claim 3, wherein the printing medium includes a first printing medium on which when a second ink droplet lands on a printing medium after a first ink droplet has landed, the second ink droplet is deposited on the first ink droplet, and a second printing medium in which the first ink droplet permeates under the second ink droplet.

8. The printing apparatus according to claim 7, wherein a group to which a mask is set varies between a case where the first printing medium is used and a case where the second printing medium is used.

9. The printing apparatus according to claim 1, wherein the fluorescent ink is ink that absorbs light of an excitation wavelength and emits light of an emission wavelength, and the light emission suppressing ink is ink that absorbs the light of the excitation wavelength.

10. The printing apparatus according to claim 9, wherein the light emission suppressing ink is ink that absorbs the light of the emission wavelength.

11. The printing apparatus according to claim 9, wherein the light emission suppressing ink is black ink.

12. A printing method comprising:
causing a printing unit to move back and forth in a scanning direction that intersects a conveyance direction of a printing medium and performing printing of an image by applying ink droplets on the printing medium from nozzles of the printing unit, the printing unit being provided with nozzle rows in the conveyance direction of the printing medium and comprising a nozzle row corresponding to fluorescent ink and a nozzle row corresponding to light emission suppressing ink that suppresses light emission of the fluorescent ink;
controlling movement of the printing unit and conveyance of the printing medium such that an image is printed by a plurality of scans of the printing unit;
in a case where the fluorescent ink is used in the printing of the image, determining an order of printing by the fluorescent ink and printing by the light emission suppressing ink in the plurality of scans;
performing the control of the movement of the printing unit and the conveyance of the printing medium based on the determined order; and
determining the order of the printing by the fluorescent ink and the printing by the light emission suppressing ink such that the fluorescent ink is printed to be in a layer lower than the light emission suppressing ink in a region of a dark portion of the image.

* * * * *